(12) United States Patent
Akama

(10) Patent No.: US 11,869,467 B2
(45) Date of Patent: Jan. 9, 2024

(54) INFORMATION PROCESSING METHOD, INFORMATION PROCESSING APPARATUS, AND INFORMATION PROCESSING PROGRAM

(71) Applicant: Sony Corporation, Tokyo (JP)

(72) Inventor: Taketo Akama, Chiba (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/772,171

(22) PCT Filed: Oct. 10, 2019

(86) PCT No.: PCT/JP2019/039939
§ 371 (c)(1),
(2) Date: Jun. 12, 2020

(87) PCT Pub. No.: WO2020/080239
PCT Pub. Date: Apr. 23, 2020

(65) Prior Publication Data
US 2021/0358461 A1  Nov. 18, 2021

(30) Foreign Application Priority Data

Oct. 19, 2018 (JP) ................................ 2018-197972
Mar. 27, 2019 (JP) ................................ 2019-061040

(51) Int. Cl.
*G10H 1/00* (2006.01)
*G06N 3/08* (2023.01)
*G06N 3/045* (2023.01)

(52) U.S. Cl.
CPC .......... *G10H 1/0025* (2013.01); *G06N 3/045* (2023.01); *G06N 3/08* (2013.01); *G10H 2210/071* (2013.01); *G10H 2250/311* (2013.01)

(58) Field of Classification Search
CPC ......... G06N 20/00; G06N 3/0454; G06N 3/08
See application file for complete search history.

(56) References Cited

U.S. PATENT DOCUMENTS 6,167,457 A * 12/2000 Eidson ...................... G06F 9/54
                                                                                       719/328
10,013,963 B1 * 7/2018 Ka ............................ G10H 1/32
(Continued)

FOREIGN PATENT DOCUMENTS

JP    2005-070806 A    3/2005
JP    2011-175006 A    9/2011
JP    2018-005520 A    1/2018

OTHER PUBLICATIONS

International Search Report and Written Opinion dated Dec. 24, 2019 for PCT/JP2019/039939 filed on Oct. 10, 2019, 8 pages including English Translation of the International Search Report.

(Continued)

*Primary Examiner* — Yi Yang
(74) *Attorney, Agent, or Firm* — XSENSUS LLP

(57) ABSTRACT

An information processing apparatus 100 according to the present disclosure includes an extraction unit 131 that extracts first data from an element constituting first content, and a model generation unit 132 that generates a learned model that has a first encoder 50 that calculates a first feature quantity which is a feature quantity of first content, and a second encoder 55 that calculates a second feature quantity which is a feature quantity of the extracted first data.

5 Claims, 19 Drawing Sheets

(56) References Cited

U.S. PATENT DOCUMENTS

| | | | | |
|---|---|---|---|---|
| 2005/0235085 | A1* | 10/2005 | Ichinose | G06F 9/4812 |
| | | | | 710/200 |
| 2006/0072165 | A1* | 4/2006 | Erol | H04N 21/44012 |
| | | | | 375/E7.2 |
| 2010/0203491 | A1* | 8/2010 | Yoon | G06Q 99/00 |
| | | | | 434/307 A |
| 2014/0260914 | A1* | 9/2014 | Matusiak | G10H 1/383 |
| | | | | 84/613 |
| 2015/0213515 | A1* | 7/2015 | Fernandez-Ruiz | |
| | | | | G06Q 30/0277 |
| | | | | 705/14.49 |
| 2015/0339543 | A1* | 11/2015 | Campanelli | G06V 30/413 |
| | | | | 382/182 |
| 2018/0307679 | A1* | 10/2018 | Duong | G06N 3/082 |
| 2018/0330511 | A1* | 11/2018 | Ha | G06V 10/7515 |
| 2019/0005399 | A1* | 1/2019 | Noguchi | G06N 3/084 |

OTHER PUBLICATIONS

Nagashima. H., and Shimizu. I., "Feature Extraction of Painting Style Using Deep Neural Network," The Institute of Electronics, Information and Communication Engineers and Information Processing Society of Japan, 2014, pp. 133-138.

Kokubo. Y. et al., "Fine-grained Pedestrian Classification by Fusing Multiple CNN Models," The Institute of Electronics, Information and Communication Engineers, IEICE Technical Report PRMU2016-166, CNR2016-33, 2017, pp. 81-85.

Briot. J. et al., "Deep Learning Techniques for Music Generation—A Survey," arXiv.org, 2017, pp. 1-108.

Adam Roberts et al: "A Hierarchical Latent Vector Model for Learning Long-Term Structure in Music 11 , Arxiv .Org, Cornell University Library, 201 Olin Library Cornell University Ithaca, NY14853, Mar. 13, 2018 (Mar. 13, 2018)," abstract; figures 1-11 ** Sections 1-3, 5Annexes A to C *.

Gaetan Hadjeres et al: "Deep8ach: a Steerable Model for Bach chorales generation", arxiv.org, Cornell University Library, 201 Olin Li Bra Ry Cornell Un I Versity Ithaca, NY 14853, Dec. 3, 2016 (Dec. 3, 2016), XP080736572, * abstract; figures 1-7 *Sections 3-4 *.

Gino Brunner et al: "MIDI-VAE: Modeling Dynamics and Instrumentation of Music with Applications to Style Transfor", arxiv.org, Cornell University Library, 201 Olin Library Cornell University Ithaca, NY 14653, Sep. 20, 2018 (Sep. 20, 2018), XP080919350, *abstract; figures 1-4: tables 1-4 *Sections 3 to 5 *.

Ian Simon et al: "Learning a Latent Space of Multitrack Measures". Arxiv .Org, Cornell University Library, 201 Olin Library Cornell University Ithaca, NY14853, Jun. 1, 2018 (Jun. 1, 2018), XP080885987, * abstract; figures 1-5 *Sections 3-5 *.

* cited by examiner

FIG.12
(a)
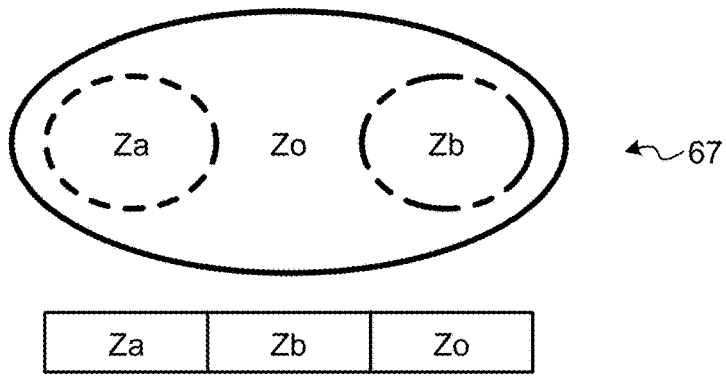
(b)
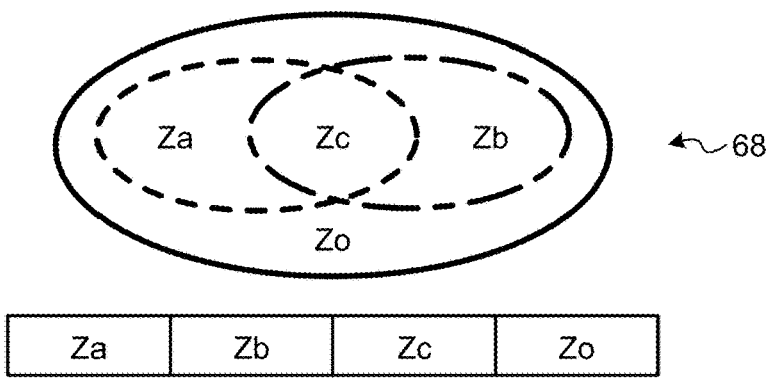
(c)
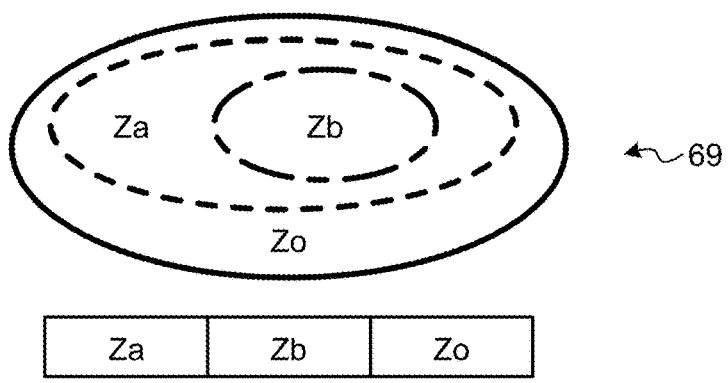

INFORMATION PROCESSING METHOD, INFORMATION PROCESSING APPARATUS, AND INFORMATION PROCESSING PROGRAM

CROSS-REFERENCE TO RELATED APPLICATIONS

The present application is based on PCT filing PCT/JP2019/039939, filed Oct. 10, 2019, which claims priority to JP 2018-197972, filed Oct. 19, 2018, and JP 2019-061040, filed Mar. 27, 2019, the entire contents of each are incorporated herein by reference.

FIELD

The present disclosure relates to an information processing method, an information processing apparatus, and an information processing program. More specifically, the present disclosure relates to a process of generating a learned model that is generated through machine learning.

BACKGROUND

In various technical fields, information processing using machine learning has been used. For example, by learning features of content (image, music, or the like) using a neural network imitating mechanism of a cerebral nervous system, other content is automatically generated.

For example, there has been proposed a technology that enables a user to automatically compose appropriate songs that match lyrics by learning features of the existing song without requiring the user to input parameters other than the lyrics.

CITATION LIST

Patent Literature

Patent Literature 1: JP 2011-175006 A

SUMMARY

Technical Problem

According to the related art, by learning language feature quantities calculated from lyrics data representing lyrics of each song and attribute data representing attributes of the song, if new lyrics data is given, it is possible to automatically generate a song that matches the new lyrics data.

However, in the related art, a melody or a chord that matches lyrics is merely generated, and a song is not necessarily generated in a manner desired by the user. For example, in the related art, it is difficult to generate a song holding a feature designated by a user, such as changing a melody while holding only a rhythm of a certain existing song. That is, in the conventional learning process, it has been difficult to perform a process of selectively learning some features (for example, a rhythm, a melody, and a constituent sound of a song) of content.

Therefore, the present disclosure proposes an information processing apparatus, an information processing method, and an information processing program that can selectively learn a feature quantity designated by a user.

Solution to Problem

To solve the problem described above, an information processing apparatus includes: an extraction unit that extracts first data from an element constituting first content; and a model generation unit that generates a learned model that has a first encoder that calculates a first feature quantity as a feature quantity of the first content, and a second encoder that calculates a second feature quantity as a feature quantity of the extracted first data.

BRIEF DESCRIPTION OF DRAWINGS

FIG. 12 is a diagram (1) illustrating an example of learning process according to a fourth modification of the present disclosure.

DESCRIPTION OF EMBODIMENTS

Embodiments of the present disclosure will be described below in detail with reference to the drawings. In each of the following embodiments, the same parts are denoted by the same reference symbols, and a repetitive description thereof will be omitted.

The present disclosure will be described in the following item order.
1. Embodiment
1-1. Overview of Information Processing according to Embodiment of Present Disclosure
1-2. Configuration of Information Processing Apparatus according to Embodiment
1-3. Information Processing Procedure according to Embodiment
2. Other Embodiments
3. Hardware Configuration

1. Embodiment

Figure 1:
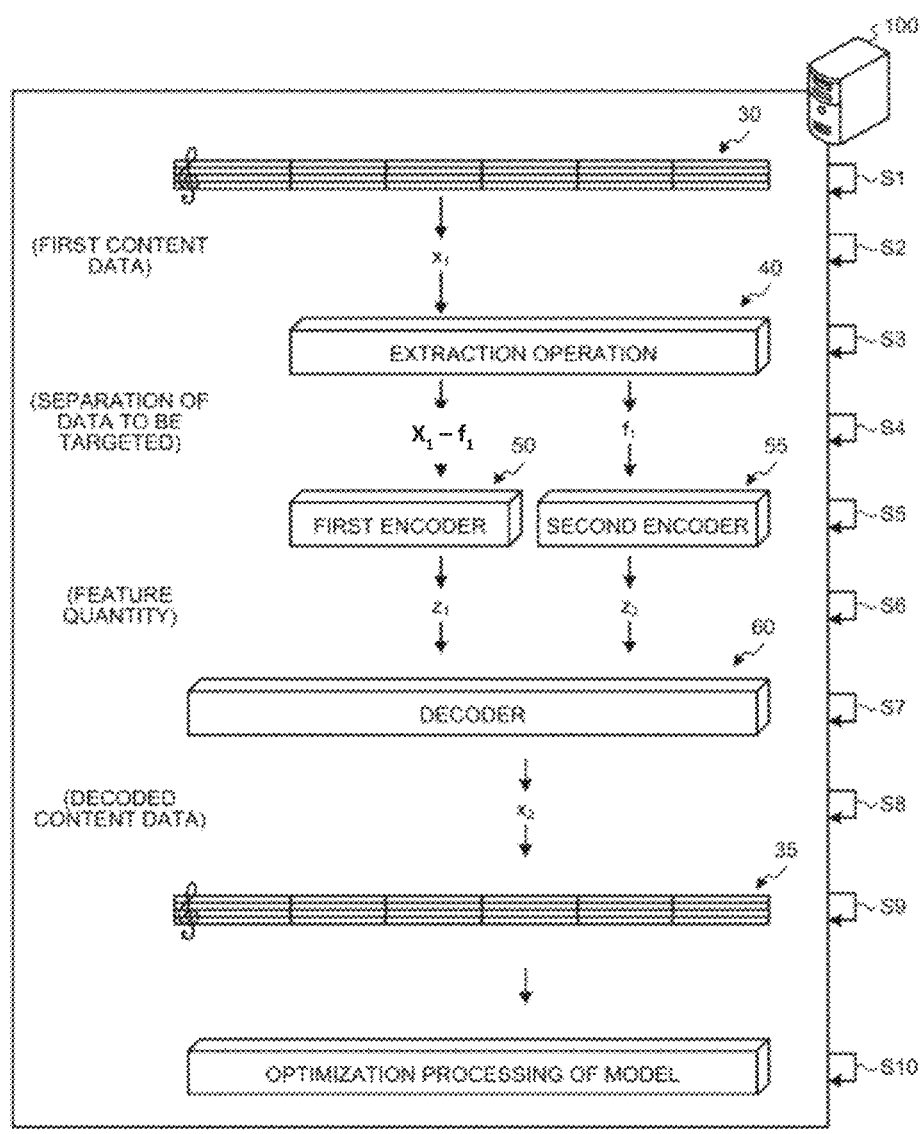
FIG. 1 is a diagram illustrating an example of information processing according to an embodiment of the present disclosure.

1-1. Overview of Information Processing According to Embodiment of the Present Disclosure FIG. 1 is a diagram illustrating an example of information processing according to an embodiment of the present disclosure. The information processing according to the embodiment of the present disclosure is realized by an information processing apparatus 100 illustrated in FIG. 1.

The information processing apparatus 100 is an apparatus that executes information processing according to the present disclosure, and is, for example, an information processing terminal or a server apparatus.

In the embodiment, the information processing apparatus 100 generates a learned model for extracting features of content, and generates new content based on the generated learned model. In the embodiment, the content is constituted by digital data of a predetermined format such as music (song), an image, and a moving image. In the example of FIG. 1, the information processing apparatus 100 is used to process a song as an example of the content.

The learned model according to the embodiment has an encoder that extracts a feature quantity from data constituting content, and a decoder that reconstitutes the content from the extracted feature quantity. For example, the information processing apparatus 100 learns an encoder by unsupervised learning such as a variational auto encoder (VAE) and generative adversarial networks (GANs). Specifically, the information processing apparatus 100 inputs content to the encoder, reconstitutes the content from the extracted feature quantity, compares content before and after the reconstituted content, and adjusts parameters of the encoder and the decoder. The information processing apparatus 100 generates a learned model by repeating such processing and optimizing the parameters of the encoder and the decoder. Thereby, the information processing apparatus 100 can generate a learned model that can obtain an appropriate feature quantity from the data constituting the content. Note that the feature quantity is represented by, for example, a vector having the number of dimensions lower than the data of the input content.

Note that the learned model is not limited to the above example, and may be any model as long as the learned model can extract the feature quantity and reconstitute the content from the extracted feature quantity.

In the example of FIG. 1, the information processing apparatus 100 inputs a song (in other words, digital data indicating a sound constituting the song) to the encoder, and extracts elements indicating features of the song such as a melody line, a constituent sound, a rhythm (temporal structure in music, for example, how many notes and rests are included, in what order sounds are reproduced, and the like), a tempo, and a beat as the feature quantities of the song.

Here, in the case of generating the learned model for extracting the feature quantity of the existing song as described above, there may be a problem of appropriately extracting the feature designated by the user. For example, if a feature quantity of an arbitrary song is extracted as it is, it is possible to reproduce features of the song, but it is sometimes difficult to use the feature quantity, such as generating new content using the feature quantity. Specifically, the feature quantity extracted using the above-described VAE or the like is a list of vector numerical values, and it is difficult for a human to recognize what features each numerical value indicate. For example, even if a new song that incorporates only a rhythmic feature of the existing song is automatically generated, it is difficult for a human to determine whether a feature quantity vector (in other words, a latent space indicating the feature quantity) is generated using any numerical value.

Therefore, the information processing apparatus 100 according to the present disclosure generates, by the information processing described below, a learned model that can extract not only the feature quantity of the entire song but also the feature quantity desired by the user. Specifically, the information processing apparatus 100 extracts predetermined data (hereinafter, referred to as "first data" for distinction) from elements (in other words, digital data constituting first content) constituting content (hereinafter, referred to as "first content" for distinction) which is a target for which a feature quantity is calculated. The information processing apparatus 100 generates a learned model that has a first encoder that calculates a first feature quantity as a feature quantity of the first content, and a second encoder that calculates a second feature quantity as a feature quantity of the extracted first data.

In this manner, the information processing apparatus 100 generates a learned model having a configuration that includes the first encoder that extracts the feature quantity of the entire first content when extracting the feature quantity of the first content, and the second encoder that handles only specific data of the first content. Although described in detail later, the first data is data extracted from the first content by a predetermined operation in order to easily extract a feature quantity designated by a user. In this way, the information processing apparatus 100 generates a learned model that can separately extract a feature quantity from the first content and some elements of the first content by using a plurality of encoders. As a result, the information processing apparatus 100 can obtain the feature quantity in which only the features desired by the user are separately expressed. In addition, the information processing apparatus 100 uses the feature quantity separately obtained to change only the features (for example, the rhythm of the song and the like) designated by the user in the existing content or not to change the feature, thereby making it possible to automatically generate new content (hereinafter, referred to as "second content" for distinction). For the sake of explanation, an encoder that extracts the feature quantity of the first content is referred to as the first encoder, and an encoder that extracts the feature quantity of the first data is referred to as the second encoder, which is for convenience. For example, the encoder that extracts the feature quantity of the first content may be the second encoder.

Hereinafter, the outline of information processing of the present disclosure will be described along with the flow with reference to FIG. 1. FIG. 1 illustrates a flow of a process in which the information processing apparatus 100 learns a learned model (first encoder 50, second encoder 55, and decoder 60) using learning data.

First, the information processing apparatus 100 acquires a song 30 as an example of the learning data (step S1). The song 30 is constituted by, for example, a symbol string (digital data) indicating a pitch, a sound length, and a rest. As an example, the pitch is a pitch that expresses a frequency indicating a pitch of a sound in predetermined steps (for example, 128 steps and the like). In addition, the sound length expresses how long the reproduced sound is maintained. In addition, the rest expresses a timing at which the reproduction of the sound stops. Further, the data indicating the song 30 may include information such as a beat or a tempo of the song 30, a symbol indicating a pause of a bar, a chord at certain timing, or a constituent sound constituting the chord.

For example, the information processing apparatus 100 converts the symbol string so that the symbol can be handled by a model. As an example, the information processing apparatus 100 uses a symbol string represented as a vector (for example, an embedding vector indicating sound information in which a pitch, a sound length, or the like is assigned to each dimension) for processing. The data indicating such a sound may be represented, for example, in a musical instrument digital interface (MIDI) (registered trademark) format, may be digital data in a known format that can be reproduced by a general-purpose sequencer, or may be represented as waveform data in a WAV format or the like.

By the above processing, the information processing apparatus 100 obtains data indicating the song 30 (step S2). In the example of FIG. 1, the data (vector) indicating the song 30 is expressed as "$x_1$".

Next, the information processing apparatus 100 executes an extraction operation 40 on the data $x_1$ (step S3). The extraction operation 40 is pre-processing for separating only a specific feature (for example, a feature desired by the user) from the song 30, which means an operation of performing a predetermined operation on the data $x_1$ and extracting predetermined data (corresponding to the "first data").

As an example, the information processing apparatus 100 extracts the first data by performing operation processing with order invariance on the data $x_1$ (step S4). The operation with order invariance means, for example, an operation using a commutative operator. Specifically, the operation with order invariance means an operation (for example, including an operation that may mean an operation with almost order invariance, such that a calculation result is slightly changed by including a predetermined coefficient) that do not depend on an order, such as addition or multiplication and a max operation. Note that in the example of FIG. 1, the information extracted from the data $x_1$ by the extraction operation 40 is expressed as feature information "$f_1$".

For example, in the example of FIG. 1, it is assumed that a user who makes the information processing apparatus 100 performs the processing desires to extract "rhythm" from the features of the song 30. The rhythm in the song is a feature that is related to time (order). For this reason, for example, when trying to extract only the rhythm from the song 30, a method for leaving information indicating an arrangement of notes (relationship between a sound length and a rest) and hiding (masking) other information can be considered.

For example, the information processing apparatus 100 performs the operation with order invariance on the data included in the data $x_1$, and loses "information indicating an order of sounds". As an example, the information processing apparatus 100 can take an average of embedding vectors in the data $x_1$ as the operation with order invariance.

Such a method will be described based on a specific example. It is assumed that an arrangement of notes corresponding to 8 beats constituting the song 30 is "C4, _, _, _, E4, _, _, R". In this example, "C4" and "E4" indicate a pitch of a sound. In addition, a symbol "_" indicates that the previous sound is extended. In addition, "R" indicates the "rest".

Here, it is assumed that the information processing apparatus 100 has a data table indicating embedding vectors corresponding to each sound or rest. The embedding vector is, for example, a d dimension (d is an arbitrary integer), and is a vector in which "1" is input to a dimension corresponding to the corresponding sound (such as "C4" or "E4"), and "0" is input to other dimensions.

That is, when referring to the arrangement of the data such as "C4, _, _, _, E4, _, _, R", the information processing apparatus 100 refers to an embedding vector of "C4" four times, and then an embedding vector of "E4" three times and an embedding vector of "R" once.

Here, the information processing apparatus 100 takes an average (may be an addition) of the embedding vectors corresponding to "C4, _, _, _, E4, _, _, R". Then, in the averaged vector, information (that is, rhythm) depending on the order is lost, and information (for example, constituent sound or the like) other than the information indicating the order of sounds is extracted. In this manner, the information processing apparatus 100 can extract "information other than the information indicating the order of sounds" in a local portion of a song.

In the feature information $f_1$ obtained in this manner, the constituent sound (that is, the pitch of the constituent sound constituting the song 30) included in the data $x_1$ is maintained, but the information (at which timing the sound is emitted, at which timing the rest is, or the like) indicating the rhythm is lost.

Subsequently, the information processing apparatus 100 inputs the original data $x_1$ to the first encoder 50 and inputs the feature information $f_1$ to the second encoder 55 which is an encoder different from the first encoder 50 (step S5). Note that the first encoder 50 and the second encoder 55 are encoders in, for example, the above-described VAE and the like, and extract a feature quantity of input data as a low-dimensional vector.

The information processing apparatus 100 obtains the feature quantities output from each of the first encoder 50 and the second encoder 55 (step S6). In the example of FIG. 1, the feature quantity of the data $x_1$ is expressed as "$z_1$", and the feature quantity of the feature information $f_1$ is expressed as "$z_2$".

Figure 2:
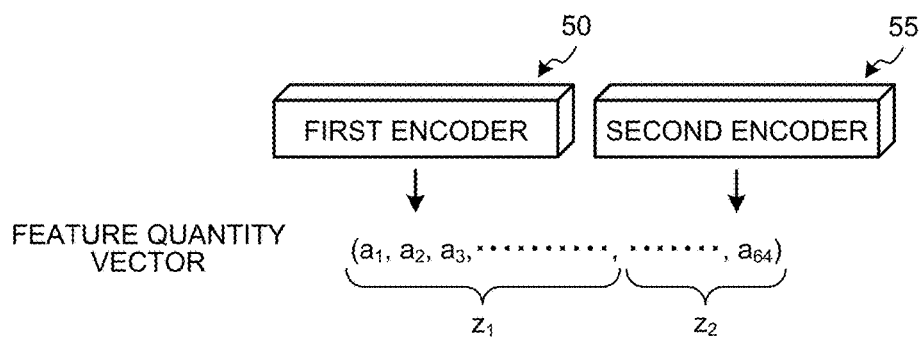
FIG. 2 is a diagram illustrating a feature quantity according to an embodiment of the present disclosure.

Note that the feature quantity $z_1$ and the feature quantity $z_2$ are separately described for description, but are actually included in one feature quantity vector. This will be described with reference to FIG. 2. FIG. 2 is a diagram for explaining a feature quantity according to an embodiment of the present disclosure.

As illustrated in FIG. 2, it is assumed that the feature quantity vector is a 64-dimensional vector in the learned model generated by the information processing apparatus 100. In this case, the feature quantity $z_1$ output from the first encoder 50 constitutes a part (for example, the first half of the feature quantity vector) of the feature quantity vector. In addition, the feature quantity $z_2$ output from the second encoder 55 also constitutes a part (for example, the second half of the feature quantity vector) of the feature quantity vector. Note that setting the feature quantity vector to be 64 dimensions, how many of the dimensions are allocated to the output of the first encoder 50, how many of dimensions are allocated to the output of the second encoder 55, or the like can be arbitrarily set.

That is, by constituting a model using a plurality of encoders, the information processing apparatus 100 can determine which dimension of the feature quantity vector is a value output from which encoder. That is, the information processing apparatus 100 can output a feature quantity vector capable of artificially interpreting which dimension indicates which feature.

Returning to FIG. 1, the description will be continued. The information processing apparatus 100 inputs to the decoder 60 the feature quantity $z_1$ and the feature quantity $z_2$ output from each of the first encoder 50 and the second encoder 55 (step S7).

The decoder 60 is a decoder that is learned to reconstitute the content based on the feature quantity extracted by the encoder. In the example of FIG. 1, the decoder 60 outputs the data $x_2$ based on the feature quantity $z_1$ and the feature quantity $z_2$ output from each of the first encoder 50 and the second encoder 55 (step S8).

The data $x_2$ has the same format as the data $x_1$ that is the data of the first content. That is, the data $x_2$ may mean data (symbol string) for reproducing the song 35 having the same format as the song 30. In other words, the information processing apparatus 100 reconstitutes the content (the song 35 in the example of FIG. 1) based on the data x2 output from the decoder 60 (step S9).

Then, the information processing apparatus 100 performs a learning process of the model based on the reconstituted content. Specifically, the information processing apparatus 100 compares the data before and after the extraction processing of the feature quantity, that is, the data $x_1$ and the data $x_2$, and optimizes parameters of the first encoder 50, the second encoder 55, and the decoder 60 so that the data $x_2$ approaches the data $x_1$ (step S10). More specifically, the information processing apparatus 100 optimizes the parameters so that a reconstitution error between the data $x_1$ and the data $x_2$ is reduced and a posterior distribution of the feature quantity approaches a prior distribution. Further, the information processing apparatus 100 acquires a plurality of pieces of learning data other than the data $x_1$ and repeats the learning process illustrated in FIG. 1 to optimize the learned model. Thereby, the information processing apparatus 100 can generate the learned model according to the present disclosure.

According to the learned model generated through the processing of FIG. 1, when a new song is input to the model, it is possible to obtain the feature quantity vector in which the feature quantity of the song is separated. In the example of FIG. 1, since the second encoder 55 according to the learned model has been learned based on data (for example, feature information $f_1$) in which the rhythm information has been lost among the learning data, the second encoder 55 is an encoder learned to extract features other than the rhythm. In other words, the feature quantity output from the second encoder 55 may mean one (one that can be interpreted by a human as to which dimension indicates the "constituent sound") that captures an order-invariant feature quantity such as the constituent sound in the song. On the other hand, the first encoder 50 according to the learned model may mean an encoder that has been learned to mainly extract the order-variable feature quantity (that is, rhythm) from the feature quantity vector. In other words, the feature quantity output from the first encoder 50 may mean one (one that can be interpreted by a human as to which dimension indicates the "rhythm") that captures only the rhythmic feature in the song.

As described above, the information processing apparatus 100 inputs the separated and extracted information to a plurality of encoders in advance and performs the learning based on the information, thereby making it possible to separate the feature quantity vector, which is normally indicated as a simple sequence of numerical values, into a specific feature. For example, if the content is a song, the information processing apparatus 100 can output the feature quantity vector in which the rhythm or the melody (such as the constituent sound of the chord) are separated. That is, the information processing apparatus 100 can generate a learned model that can separate features specified by the user (can selectively learn the feature quantity designated by the user).

Figure 3:
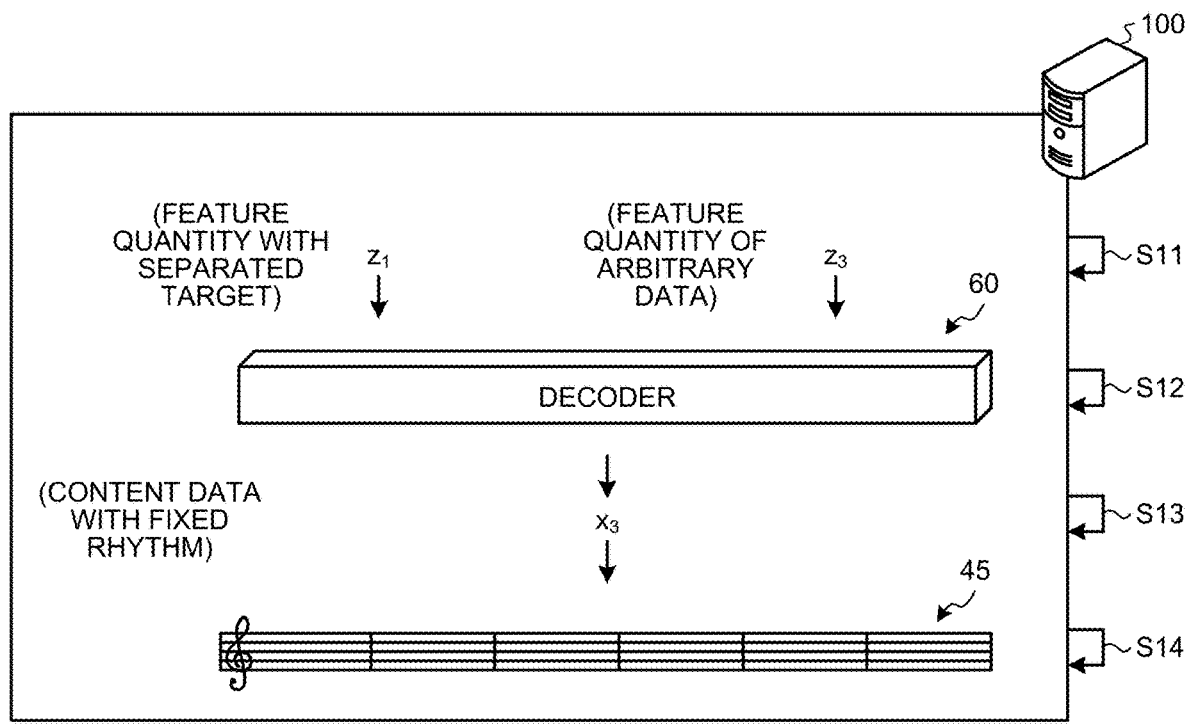
FIG. 3 is a diagram for explaining a generation process according to an embodiment of the present disclosure.

In addition, the information processing apparatus 100 can also generate new content (second content) having the feature designated by the user by using the generated learned model. This will be described with reference to FIG. 3. FIG. 3 is a diagram for explaining the generation process according to the embodiment of the present disclosure.

As illustrated in FIG. 3, the information processing apparatus 100 acquires the feature quantity $z_1$ illustrated in FIG. 1 (step S11). As described above, the feature quantity $z_1$ is the feature quantity that includes relatively more rhythm-related features in the song 30. In other words, the feature quantity $z_1$ is the feature quantity for which the target is separated from the song 30.

On the other hand, the information processing apparatus 100 acquires a feature quantity $z_3$ which is the feature quantity having the same dimension as the feature quantity $z_2$ illustrated in FIG. 1 (step S11). The feature quantity $z_3$ indicates a feature quantity of arbitrary data. The feature quantity of the arbitrary data is, for example, feature quantities extracted from other songs other than the song 30 using the second encoder 55. Alternatively, the feature quantity of the arbitrary data may also be the feature quantity sampled from the prior distribution of the feature quantity such as the feature quantity $z_2$.

Then, the information processing apparatus 100 inputs the feature quantity $z_1$ and the feature quantity $z_2$ to the decoder 60 (step S12). The information processing apparatus 100 acquires the data $x_3$ output from the decoder 60 (step S13). Subsequently, the information processing apparatus 100 reconstitutes the song 45 as the second content from the data $x_3$ (step S14).

As described above, the feature quantity $z_1$ is a feature quantity indicating a rhythmic feature of a song 30. For this reason, the song 45 reconstituted by the data $x_3$ takes over the features of the rhythm of the song 30 (for example, an arrangement order of notes, a division of notes, the number of bars, a tempo, and the like), and the constituent sound or the like is a song having a feature indicated by the feature quantity $z_3$. Specifically, the song 45 maintains a song that has a scale played by the rhythm different from that (for example, a scale that reflects the features of the constituent sound in the feature quantity $z_3$) of the song 30 while maintaining the rhythm of the song 30. Note that after reconstituting the song 45, the information processing apparatus 100 may repeat re-sampling of the feature quantity $z_3$ from the prior distribution while fixing the feature quantity $z_1$ (fixing the rhythm). As a result, the information processing apparatus 100 can automatically generate a plurality of songs played on different scales while maintaining the same rhythmic feature. Here, upon generating the second content, the feature quantity $z_1$ is not necessarily the same as the feature quantity $z_1$ illustrated in FIG. 1, and a value sampled from the prior distribution of the feature quantity $z_1$ may be used.

Thereby, the information processing apparatus 100 can separate and extract a certain feature (rhythm in this example) and generate content using the extracted feature quantity, and as a result, can freely generate a song having the user desired feature. For example, the information processing apparatus 100 can generate a variation of a song having a different constituent sound while fixing the rhythm. In addition, when not fixing the rhythm but fixing the features of the constituent sound (in the above example, the feature quantity $z_2$ is fixed, and different feature quantities are input to a location corresponding to the feature quantity $z_1$), the information processing apparatus 100 can generate a variety of arpeggio variations, such as playing various rhythms (phrases), with fixed chord types. In other words, if the feature is a feature that can be designated by a user (in other words, can describe a rule that generates the feature information), the information processing apparatus 100 fixes any music concept and can automatically generate songs having various variations.

Note that in the above step S4, an example has been illustrated in which the information processing apparatus 100 extracts the feature information $f_1$ on the rhythm using the order invariance in the data $x_1$. Here, the information processing apparatus 100 may extract the feature information $f_1$ by using a method for losing information indicating a pitch.

A description will be given based on a specific example similar to that in the above step S4. It is assumed that an arrangement of notes corresponding to 8 beats constituting the song 30 is "C4, _, _, _, E4, _, _, R". In this example, "C4" and "E4" indicate a pitch of a sound. In addition, a symbol "_" indicates that the previous sound is extended. In addition, "R" indicates the "rest".

Here, the information processing apparatus 100 deletes the information indicating the pitch. For example, the information processing apparatus 100 replaces information such as "C4" and "E4" with common information such as "M". As a result, the information constituting the song 30 is "M, _, _, _, M, _, _, R". Such information is information in which only the pitch is lost, but the information in which the rhythm is maintained.

In this case, since the extracted information (referred to as "feature information $f_2$") is different, the learning of the encoder after step S5 is also different. That is, since the feature information $f_2$ has information that maintains the rhythm of the song 30, the second encoder 55 that learns such information is learned to output the feature quantity $z_2$ indicating the "rhythmic feature" of the song. On the other hand, the first encoder 50 is learned to output the feature quantity $z_1$ other than the "rhythmic feature" of the song. That is, the encoder that extracts information different from the example illustrated in FIG. 1 is learned. In this manner, the learning of the first encoder 50 and the second encoder 55 variously varies in advance depending on the type of the extraction operation 40.

Note that the example of FIG. 1 illustrates an example of learning the features of the entire song 30, but the information processing apparatus 100 may pause a song 30 in each predetermined section and acquire data (partial data) of content in each section.

In this case, the information processing apparatus 100 may divide the song 30 into the partial data using various known methods. For example, the information processing apparatus 100 detects a preset pause of a bar and divides the song 30 into the partial data (bar). Alternatively, the information processing apparatus 100 may divide the song 30 into the partial data based on the relationship between the beat and the note. For example, if the song 30 is 4/4 beat, the information processing apparatus 100 detects, as one pause, a point in time when four sounds having a length corresponding to a quarter note are reproduced, and divides the song 30 into the bars.

In addition, the information processing apparatus 100 may use the pause other than the bar as the partial data. For example, the information processing apparatus 100 may detect a pause of a melody line of the song 30 (for example, a location where a rest having a length exceeding a predetermined threshold appears, and the like) and divide the song into the partial data. In this case, the partial data does not necessarily need to match the bar. Further, the information processing apparatus 100 may detect timing when the chord is changed in the song 30, or the like and may divide the song 30 into the partial data based on the detected timing.

Figure 4:
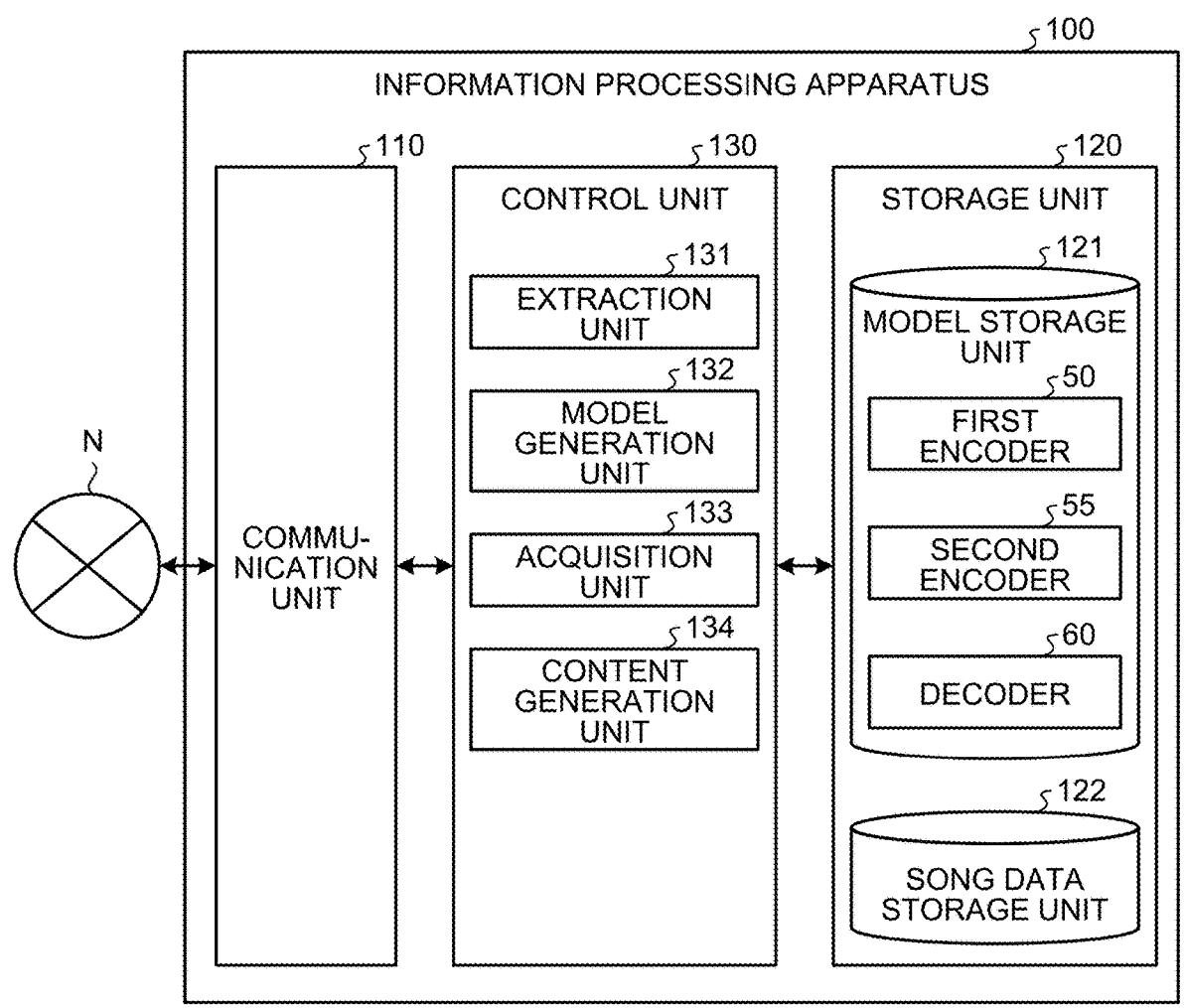
FIG. 4 is a diagram illustrating a configuration example of an information processing apparatus according to an embodiment of the present disclosure.

1-2. Configuration of Information Processing Apparatus According to Embodiment Next, a configuration of an information processing apparatus 100 that is an example of an information processing apparatus that executes information processing according to an embodiment will be described. FIG. 4 is a diagram illustrating a configuration example of the information processing apparatus 100 according to the embodiment of the present disclosure.

As illustrated in FIG. 4, the information processing apparatus 100 has a communication unit 110, a storage unit 120, and a control unit 130. Note that the information processing apparatus 100 may have an input unit (for example, a keyboard or a mouse) that receives various operations from a manager or the like who manages the information processing apparatus 100, or a display unit (for example, a liquid crystal display or the like) that displays various information.

The communication unit 110 is realized by, for example, a network interface card (NIC) or the like. The communication unit 110 is connected to a network N (such as the Internet) in a wired or wireless manner, and transmits and receives information to and from other apparatuses or the like via the network N.

The storage unit 120 is realized by, for example, semiconductor memory elements such as a random access memory (RAN) or a flash memory, or storage devices such as a hard disk or an optical disk. The storage unit 120 includes a model storage unit 121 and a song data storage unit 122.

The model storage unit 121 stores the learned model. Specifically, the model storage unit 121 includes the first encoder 50 and the second encoder 55 that extract a feature quantity of content, and the decoder 60 that reconstitutes the content. Note that the model storage unit 121 may store learning data such as content used for learning.

Figure 5:
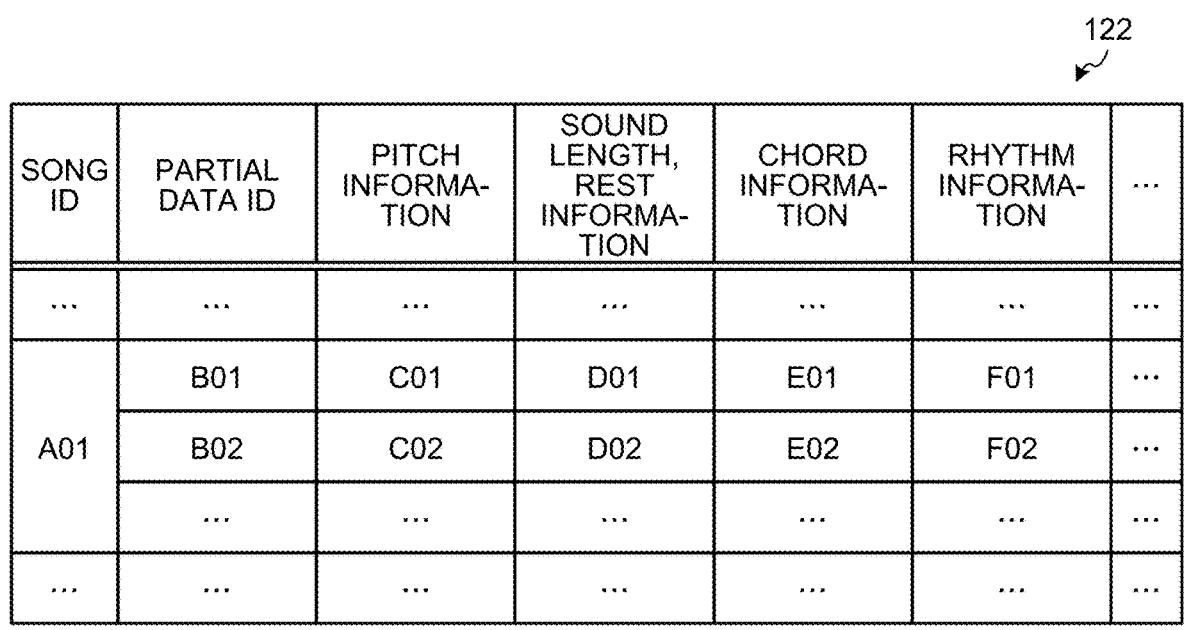
FIG. 5 is a diagram illustrating an example of a song data storage unit according to an embodiment of the present disclosure.

The song data storage unit 122 stores data related to content (song) input to the model. FIG. 5 illustrates an example of the song data storage unit 122 according to the embodiment. FIG. 5 is a diagram illustrating an example of the song data storage unit 122 according to the embodiment of the present disclosure. In the example illustrated in FIG. 5, the song data storage unit 122 has items such as "song ID", "partial data ID", "pitch information", "sound length rest information", "chord information", and "rhythm information".

The "song ID" is identification information for identifying a song. The "partial data ID" is identification information for identifying the partial data. The partial data corresponds to, for example, one or a plurality of bars constituting a song.

The "pitch information" indicates information on a pitch (scale) of a sound included in the partial data. The "sound length rest information" indicates a length of sound (reproduction time or reproduced beat) included in the partial data or a length or timing of the rest. The "chord information" indicates a type of chords included in the partial data, the constituent sound of the chord, the switching of the chords in the bar, and the like. The "rhythm information" indicates a beat or a tempo of a bar, a position of a strong beat, a position of a weak beat, and the like.

Note that in FIG. 5, items such as the pitch information are conceptually described as "C01", but in actuality, each item stores specific data indicating the sound as described above. In addition, for the sake of explanation, FIG. 5 illustrates an example in which the "pitch information", the "sound length rest information", or the like are stored as different items, but these pieces of information may be collectively stored in one item or the like as the information indicating notes included in the bar. That is, the format of the data indicating the song is not limited to the format illustrated in FIG. 5, but may be any format as long as the format can be handled by the model.

For example, the example illustrated in FIG. 5 illustrates that a song identified by song ID "A01" has partial data identified by partial data ID "B01" or "B02". In addition, partial data having partial data ID "B01" includes sound data whose pitch information is "C01", sound length rest information is "D01", chord information is "E01", and rhythm information is "F01".

Returning to FIG. 4, the description will be continued. The control unit 130 is realized by, for example, a central processing unit (CPU), a micro processing unit (MPU), or the like which causes a program (for example, the information processing program according to the present disclosure) stored in the information processing apparatus 100 to execute a random access memory (RAN) or the like as a work area. In addition, the control unit 130 is a controller, and may be realized by an integrated circuit such as an application specific integrated circuit (ASIC) or a field programmable gate array (FPGA).

As illustrated in FIG. 4, the control unit 130 includes an extraction unit 131, a model generation unit 132, an acquisition unit 133, and a content generation unit 134, and implements or executes functions or operations of information processing described below. Note that the internal configuration of the control unit 130 is not limited to the configuration illustrated in FIG. 4, but may be other configurations as long as the control unit 130 performs information processing described later.

The extraction unit 131 extracts the first data from the elements constituting the first content. For example, the extraction unit 131 extracts the first data from the elements constituting the first content based on a predetermined rule according to the user's designation. For example, the extraction unit 131 performs the extraction operation on the digital data constituting the first content which is a song to extract the first data.

For example, the extraction unit 131 receives the operation designated by the user for the first content and the designation of the range in which the operation is performed, and executes the operation in the received range. Specifically, in the song 30 illustrated in FIG. 1, the extraction unit 131 receives from the user the operation of extracting only the rhythm from the song 30 and the designation of the range (for example, bar and the like) in which the rhythm is extracted. Then, the extraction unit 131 executes the operation related to the extraction according to the user's designation.

As an example of the operation, the extraction unit 131 extracts the first data by performing the operation processing with order invariance on the elements included in the range. For example, the extraction unit 131 performs an order-invariant operation, such as addition, multiplication, or max operation, on the data constituting the first content. By such processing, the extraction unit 131 can extract, from the first content, the first data in which only the information (rhythm in the example of the song) depending on the order is masked.

Note that the extraction unit 131 may extract, from the elements included in the range, the first data by losing information that is not time-dependent or order-dependent. In the song, the information that is not time-dependent or order-dependent includes, for example, the constituent sound of the chord in a certain bar, tonality of the song, the total number of notes, the beat of the song, and the like. On the other hand, examples of the information depending on the time or the order include the rhythm information of the song.

For example, the extraction unit 131 can extract the first data in which only the rhythm information is maintained by losing the pitch information which is the information that is not time-dependent or order-dependent among information in a specific range of the first content.

The model generation unit 132 generates a learned model that has the first encoder 50 that calculates the first feature quantity as the feature quantity of the first content, and the second encoder 55 that calculates the second feature quantity as the feature quantity of the first data extracted by the extraction unit 131. Note that the number of encoders included in the learned model is not limited to two, and a larger number of encoders may be included in the learned model.

Further, the model generation unit 132 generates a learned model including the decoder 60 that decodes data corresponding to the first content based on the first feature quantity and the second feature quantity. That is, when decoding the feature quantity extracted from the plurality of encoders, the model generation unit 132 generates a learned model that is configured to be decoded by one common decoder 60.

For example, in the case of learning content data such as a song, the model generation unit 132 inputs the content data to the first encoder 50, and inputs the feature information extracted from the content data to the second encoder 55. Subsequently, the model generation unit 132 inputs the feature quantities output from the first encoder 50 and the second encoder 55 to the decoder 60, and reconstitutes the content (song). Then, the model generation unit 132 adjusts parameters of the first encoder 50, the second encoder 55, and the decoder 60 so that the difference between the data of the previous and next contents is reduced. The model generation unit 132 repeats such processing, and generates the learned model in which the first encoder 50, the second encoder 55, and the decoder 60 are optimized. As described above, the model generation unit 132 may generate the model using various known methods such as VAE and GAN.

The acquisition unit 133 acquires various information. For example, the acquisition unit 133 acquires data input to the learned model generated by the model generation unit 132.

For example, the acquisition unit 133 acquires the feature quantity output from the first encoder 50 or the feature quantity output from the second encoder 55. Further, the acquisition unit 133 may change the output feature quantity and acquire the acquired information as the information to be input to the learned model. For example, the acquisition unit 133 may obtain new feature quantities by sampling the known feature quantity from the prior distribution of the known feature quantity.

Further, the acquisition unit 133 may acquire arbitrary data from the information processing terminal used by the user. For example, the acquisition unit 133 acquires data constituting a song. Then, the acquisition unit 133 may input the acquired data to the learned model (in this case, inputs the same data to the first encoder 50 and the second encoder 55, respectively), and acquire the feature quantities output from each encoder.

The content generation unit 134 inputs to the decoder the feature quantities output from the learned first encoder 50 or second encoder 55, or values obtained by combining any of the feature quantities generated based on these feature quantities, thereby generating the second content which is new content having the same format as the first content. Note that the feature quantity generated based on the feature quantities output from the learned first encoder 50 or second encoder 55 are, for example, the feature quantity which is obtained by being sampled from the prior distribution of the feature quantity output from any of the encoders.

For example, the content generation unit 134 may generate the second content based on the feature quantities output by inputting arbitrary data to the learned first encoder 50 or second encoder 55. Alternatively, as in the example illustrated in FIG. 3, the content generation unit 134 may generate the second content from values (for example, 64-dimensional vector) by combining the known feature quantity (feature quantity $z_1$ in the example of FIG. 3) generated and the feature quantity (feature quantity $z_3$ in the example of FIG. 3) obtained by inputting arbitrary data to the learned first encoder 50 or second encoder 55.

Note that, as described above, the feature quantity holding the user desired features is changed according to the operation designated by the user. That is, which of the feature quantity output from the first encoder 50 and the feature quantity output from the second encoder 55 holds the user desired feature is changed according to the type of operation or extraction operation designated by the user. In any case, if a value (for example, a value forming the 64-dimensional vector if the feature quantity is the 64-dimensional vector) corresponding to the feature quantity input to the decoder 60 is obtained, the content generation unit 134 can generate the second content corresponding to the feature quantity.

In addition, the content generation unit 134 may input to the decoder 60 the values obtained by combining the feature quantity output from the learned first encoder 50 and the feature quantity output from the learned second encoder 55 to generate the second content, without using the known feature quantity. For example, the content generation unit 134 may generate the second content based on the values obtained by combining arbitrary data (song or the like) obtained by the acquisition unit 133 and each feature quantity output by inputting the arbitrary data to the learned first encoder 50 or second encoder 55.

In addition, the content generation unit 134 may generate a plurality of second contents in order by fixing the values corresponding to any of the feature quantities among the combined values and changing values corresponding to other feature quantities in order. For example, when the first half of the feature quantity indicates the rhythmic feature, the content generation unit 134 can generate a plurality of songs whose rhythms are maintained in order by fixing the first half of the feature quantity and changing the second half.

1-3. Information Processing Procedure According to Embodiment

Figure 6:
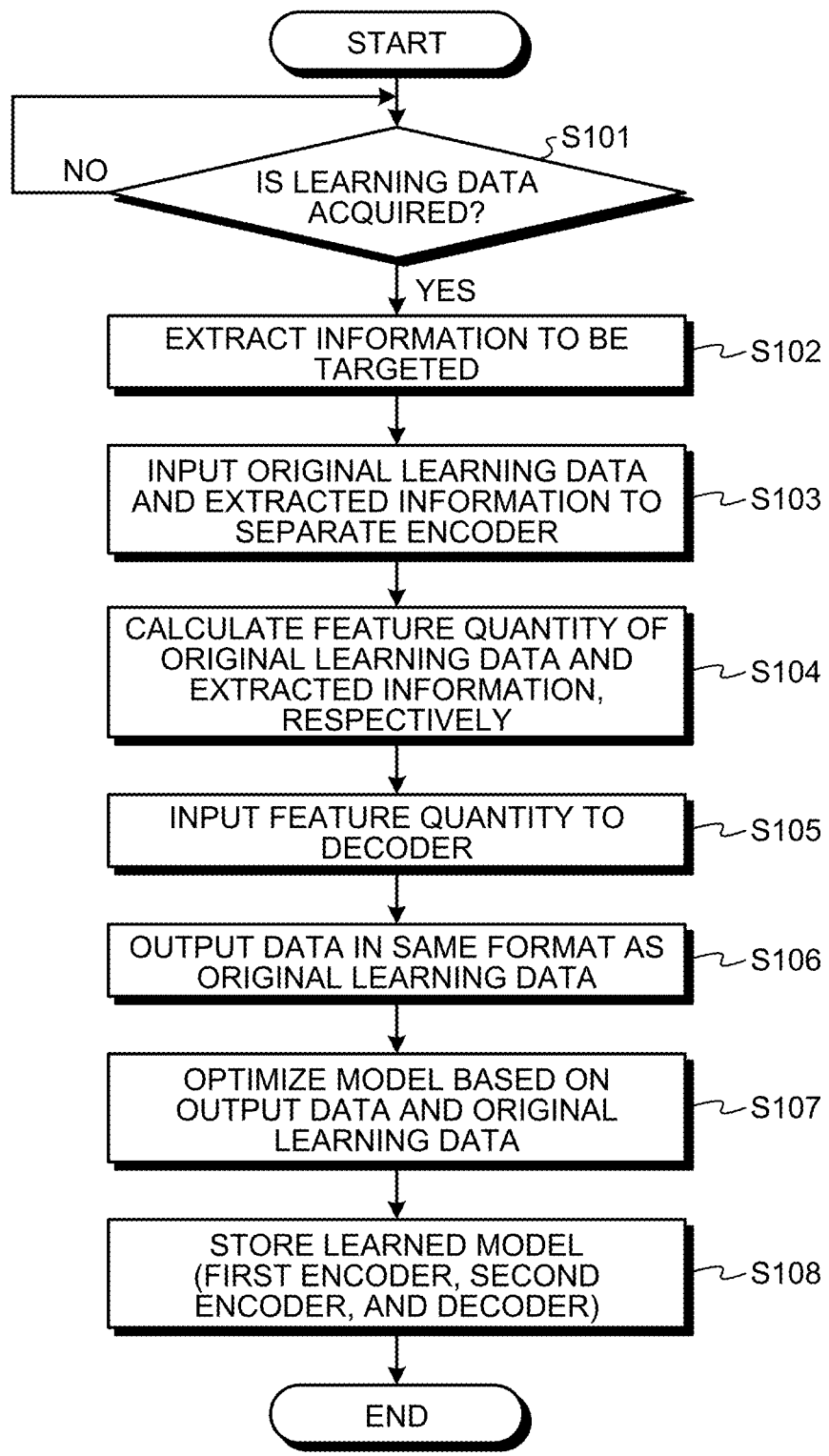
FIG. 6 is a flowchart (1) illustrating an example of an information processing procedure according to an embodiment of the present disclosure.

Next, an information processing procedure according to the embodiment will be described with reference to FIGS. 6 and 7. First, the flow of the learning process according to the embodiment of the present disclosure will be described with reference to FIG. 6. FIG. 6 is a flowchart (1) illustrating the information processing procedure according to the embodiment of the present disclosure.

As illustrated in FIG. 6, the information processing apparatus 100 determines whether or not learning data (content) has been acquired (step S101). When the learning data is not acquired (step S101; No), the information processing apparatus 100 waits until acquiring the learning data.

On the other hand, when the learning data is acquired (step S101; Yes), the information processing apparatus 100 extracts targeted information (feature information) (step S102).

Then, the information processing apparatus 100 inputs the original learning data and the extracted information to separate encoders (step S103). For example, the information processing apparatus 100 inputs the original learning data to the first encoder 50 and inputs the extracted information to the second encoder 55.

Then, the information processing apparatus 100 calculates feature quantities of each of the original learning data and the extracted information (step S104). Subsequently, the information processing apparatus 100 inputs the calculated feature quantity to the decoder 60 (step S105).

Thereby, the information processing apparatus 100 causes the decoder 60 to output data in the same format as the original learning data (step S106). Then, the information processing apparatus 100 optimizes a model based on the output data and the original learning data (step S107). For example, the information processing apparatus 100 compares the output data with the original learning data, and optimizes parameters of the model so as to reduce a reconstitution error. Note that the information processing apparatus 100 may repeat the processes from step S101 to step S107 a sufficient number of times (for example, until the parameters are settled within a predetermined threshold) for model optimization.

The information processing apparatus 100 stores the learned model (the first encoder 50, the second encoder 55, and the decoder 60) in the storage unit 120 (step S108) As a result, the information processing apparatus 100 ends the learning process.

Next, the flow of the generation process according to the embodiment of the present disclosure will be described with reference to FIG. 7. FIG. 7 is a flowchart (2) illustrating the information processing procedure according to the embodiment of the present disclosure.

Figure 7:
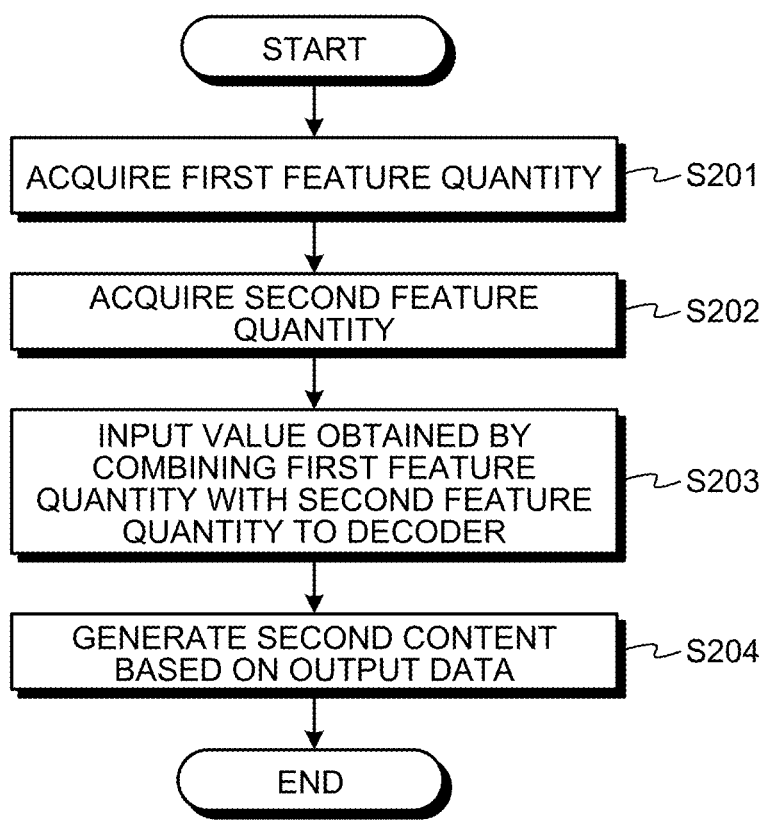
FIG. 7 is a flowchart (2) illustrating the information processing procedure according to the embodiment of the present disclosure.

As illustrated in FIG. 7, the information processing apparatus 100 acquires a first feature quantity (step S201). For example, the first feature quantity is an output from the learned first encoder 50. Further, the information processing apparatus 100 acquires the second feature quantity (step S202). For example, the second feature quantity is an output from the learned second encoder 55.

Then, the information processing apparatus 100 inputs values obtained by combining the acquired first feature quantity and second feature quantity to the decoder 60 (step S203).

Subsequently, the information processing apparatus 100 generates the second content based on the data output from the decoder 60 (step S204).

2. Other Embodiments

The process according to each embodiment described above may be performed in various different forms (modifications) in addition to each embodiment described above.

2-1. Variation of Learning and Generation Process

In the above embodiment, a learned model including two encoders and one decoder has been described. Here, the information processing apparatus 100 may learn various models having configurations different from those in the above embodiment. This will be described with reference to FIG. 8.

Figure 8:
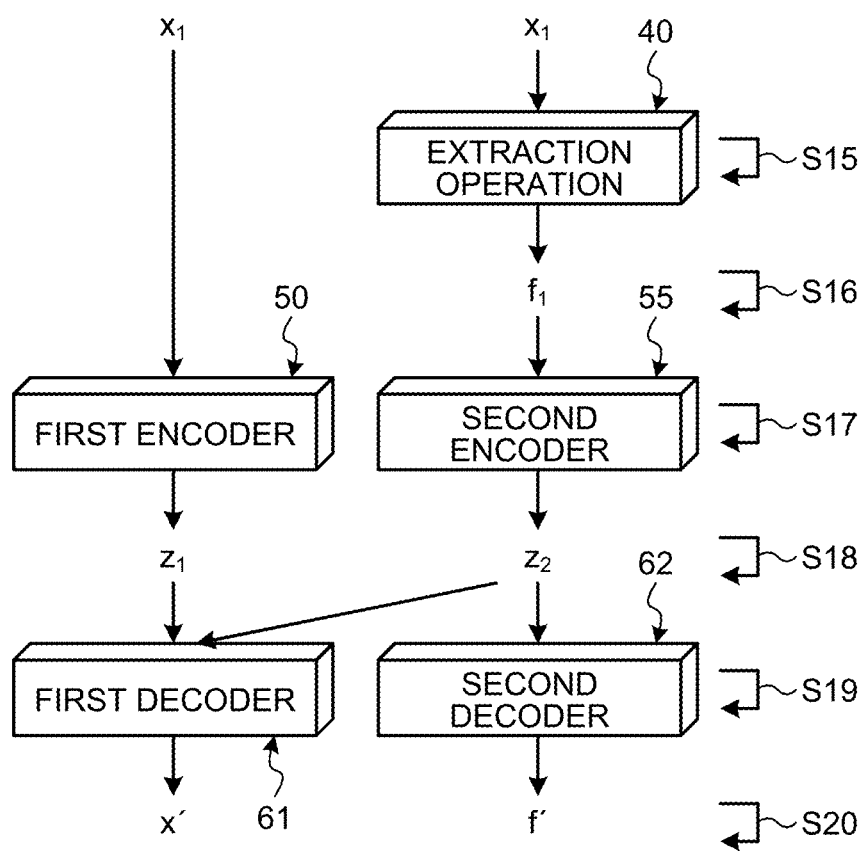
FIG. 8 is a diagram illustrating an example of learning process according to a first modification of the present disclosure.

FIG. 8 is a diagram illustrating an example of a learning process according to a first modification of the present disclosure. Compared with the example illustrated in FIG. 1, the example illustrated in FIG. 8 is different from the example illustrated in FIG. 1 in that the model has a first decoder 61 and a second decoder 62.

In the example illustrated in FIG. 8, the information processing apparatus 100 executes the extraction operation 40 on the data $x_1$ (step S15), and extracts the feature information $f_1$ (step S16) as in step S1 illustrated in FIG. 1. Further, the information processing apparatus 100 inputs the data $x_1$ to the first encoder 50 and inputs the feature information $f_1$ to the second encoder 55 as in step S5 illustrated in FIG. 1 (step S17). Thereby, the information processing apparatus 100 acquires the feature quantity $z_1$ and the feature quantity $z_2$ (step S18). In other words, such operation means that the information processing apparatus 100 performs a function operation corresponding to the first encoder 50 or the second encoder 55 on the data $x_1$ and the feature information $f_1$ and outputs the feature quantity $z_1$ and the feature quantity $z_2$.

Subsequently, the information processing apparatus 100 inputs the feature quantity $z_1$ and the feature quantity $z_2$ to the first decoder 61, and inputs the feature quantity $z_2$ to the second decoder 62 (step S19). In other words, such operation means that the information processing apparatus 100 performs a function operation corresponding to the first decoder 61 on the feature quantity $z_1$ and the feature quantity $z_2$, and performs a function operation corresponding to the second decoder 62 on the feature quantity $z_2$.

The information processing apparatus 100 obtains data x' from the first decoder 61 by the operation in step S19. Further, the information processing apparatus 100 obtains feature information f' from the second decoder 62 (step S20). Note that the data x' is data having the same format as the data $x_1$, and conceptually indicates data output via the decoder. In addition, the feature information f' is data having the same format as the feature information $f_1$, and conceptually indicates the feature information output via the decoder.

Thereafter, the information processing apparatus 100 adjusts the parameters of each encoder and decoder so that the data x' approaches the data $x_1$ and the feature information f' approaches the feature information $f_1$. That is, the information processing apparatus 100 performs a model optimization process in the same manner as in step S10 illustrated in FIG. 1.

Thus, the information processing apparatus 100 may learn a model having two decoders. In other words, the information processing apparatus 100 generates the learned model that has a first decoder 61 that decodes data corresponding to the first content (data $x_1$) based on the first feature quantity (feature quantity $z_1$) and the second feature quantity (feature quantity $z_2$), and a second decoder 62 that decodes data (feature information $f_2$) corresponding to first data (feature information $f_1$) extracted from elements constituting the first content based on the second feature quantity.

According to such configuration, the feature quantity $z_2$ learned by the second encoder 55 and the second decoder 62 reliably has the information on the feature information $f_1$ as compared with the configuration illustrated in FIG. 1. For this reason, the information processing apparatus 100 can stably perform learning in which features are separated. More specifically, the information processing apparatus 100 can more reliably learn information (for example, the rhythm of the song) separated as the feature information $f_1$ by the configuration illustrated in FIG. 8.

Figure 9:
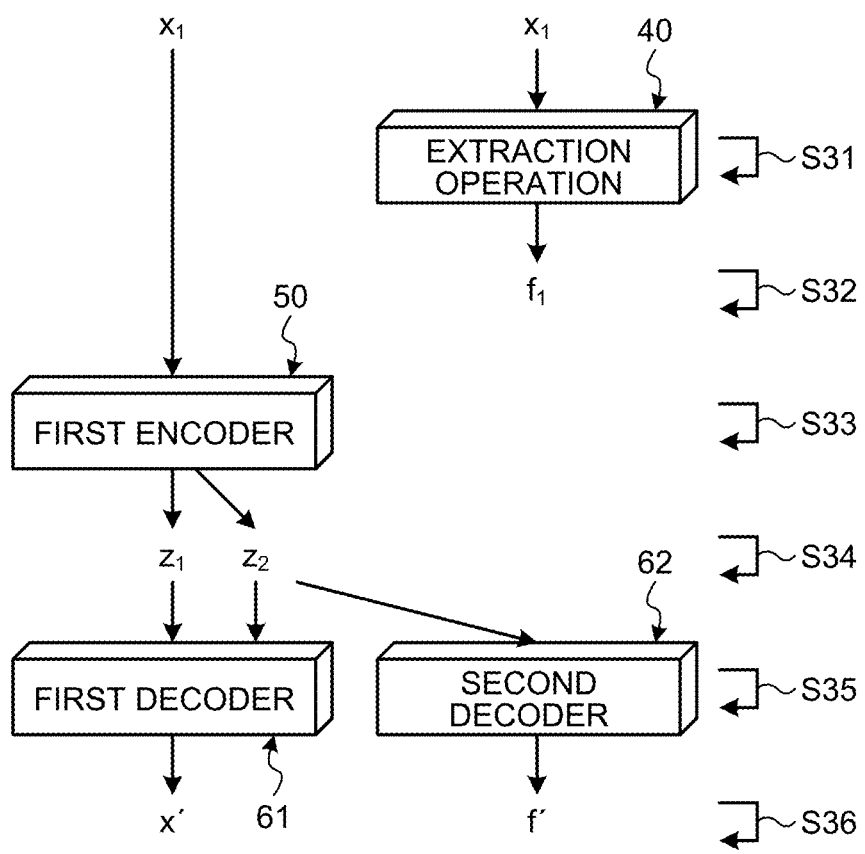
FIG. 9 is a diagram illustrating an example of learning process according to a second modification of the present disclosure.

Note that the model illustrated in FIG. 8 can have a further different configuration. This will be described with reference to FIG. 9. FIG. 9 is a diagram illustrating an example of a learning process according to a second modification of the present disclosure.

Compared with the example illustrated in FIG. 8, the example illustrated in FIG. 9 is different from the example illustrated in FIG. 8 in that the model does not have the second encoder 55.

In the example illustrated in FIG. 9, the information processing apparatus 100 executes the extraction operation 40 on the data $x_1$ (step S31), and extracts the feature information $f_1$ (step S32) as in step S15 illustrated in FIG. 8. Here, the information processing apparatus 100 inputs the data $x_1$ to the first encoder 50 (step S33) and obtains the feature quantity $z_1$ and the feature quantity $z_2$ (step S34). In this case, the information processing apparatus 100 sets a predetermined rule in advance for the value output from the first encoder 50, and outputs the feature quantity $z_1$ and the feature quantity $z_2$. For example, the information processing apparatus 100 sets rules in advance so that the first 32 dimensions of the 64-dimensional vector output are the feature quantity $z_1$ and the second 32 dimensions are the feature quantity $z_2$.

Subsequently, the information processing apparatus 100 inputs the feature quantity $z_1$ and the feature quantity $z_2$ to the first decoder 61, and inputs the feature quantity $z_2$ to the second decoder 62 (step S35). The information processing apparatus 100 obtains the data x' from the first decoder 61 by the operation in step S35. Further, the information processing apparatus 100 obtains the feature information f' from the second decoder 62 (step S36).

Thereafter, the information processing apparatus 100 adjusts the parameters of each encoder and decoder so that the data x' approaches the data $x_1$ and the feature information f' approaches the feature information $f_1$.

As described above, the information processing apparatus 100 can perform the learning in which the feature quantity is separated as illustrated in FIGS. 1 and 8 even in the configuration in which the second encoder 55 is omitted. Thereby, the information processing apparatus 100 can simplify the configuration of the model, and as a result, for example, the learning process can be performed quickly or the processing load can be reduced.

Figure 10:
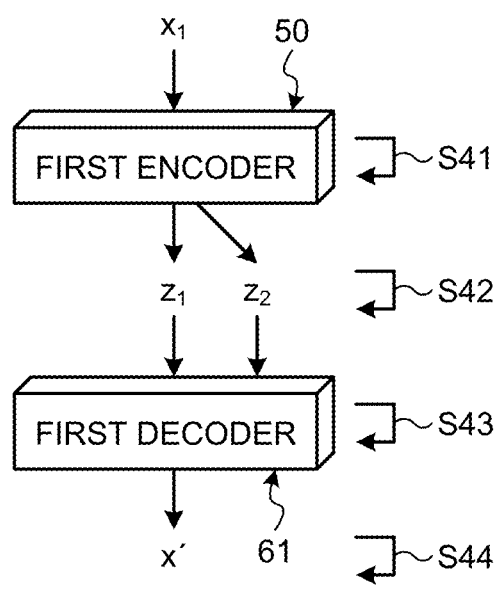
FIG. 10 is a diagram illustrating an example of a generation process according to a third modification of the present disclosure.

Next, a modification of the generation process in a case of generating new content will be described with reference to FIG. 10. FIG. 10 is a diagram illustrating an example of a generation process according to a third modification of the present disclosure.

FIG. 10 illustrates a flow of a process upon generating new content from the learned first encoder 50 and first decoder 61. Note that the first encoder 50 and the first decoder 61 are, for example, an encoder and a decoder whose parameters have been learned through learning in FIG. 9 and the like.

The information processing apparatus 100 inputs arbitrary data $x_1$ to the first encoder 50 (step S41) and obtains the feature quantity $z_1$ and the feature quantity $z_2$ (step S42). Then, the information processing apparatus 100 inputs the feature quantity $z_1$ and the feature quantity $z_2$ to the first decoder 61 (step S43), and obtains the data x' (step S44). Note that the information processing apparatus 100 may not obtain a feature quantity input to the first decoder 61 from the first encoder 50, but obtain a feature quantity by sampling the feature quantity input to the first decoder 61 from the distribution of the pre-learned feature quantity.

In this way, the information processing apparatus 100 can generate the data x', which is new content, from the learned model (in this example, the first encoder 50 and the first decoder 61) having a simple configuration. According to such a configuration, the information processing apparatus 100 inputs both the feature quantity $z_1$ and the feature quantity $z_2$ to one decoder, and as a result, can obtain, for example, the data x' including features that are not completely separated. As a result, the information processing apparatus 100 can generate new content including even rhythm information that is not completely separated into, for example, the feature quantity $z_2$ and is also assumed to remain even in the feature quantity $z_1$.

2-2. Variation of Extraction Operation

In the above embodiment, as an example of the extraction operation 40, an example has been described in which a predetermined operation is performed to extract order-invariant information (for example, rhythm information) from a song 30. The information processing apparatus 100 may perform various operations as the extraction operation 40 in addition to this example.

For example, in the above embodiment, the example has been illustrated in which the information processing apparatus 100 extracts a chord constituent sound of the song 30, but the information processing apparatus 100 may extract not only the chord constituent sound but also a constituent sound of a melody or a constituent sound of a drum. The constituent sound of the melody indicates, for example, the type of sound and the like that appears in a certain section, such as a bar of a song. In addition, the constituent sound of the drum indicates, for example, a type of sound (snare drum, bass drum, or the like) of the drum set and the like that appears in a certain section, such as the bar of the song.

In addition, the information processing apparatus 100 may extract information (so-called Melodic Contour) indicating a flow of a pitch, such as whether the pitch is raised, lowered, or stopped in a flow of a song. In addition, the information processing apparatus 100 may extract the scale of the sound that constitutes the song (information indicating which of the 12 sounds is used to compose a song). Further, the information processing apparatus 100 may extract information (ordered constituent sound) that gives an order to constituent sounds. For example, the information processing apparatus 100 may extract information (for example, a sequence of pitches such as 1 degree, 1 degree, and 2 degree) in which pitches of adjacent notes are ordered and arranged.

In addition, the information processing apparatus 100 may extract a pattern-classified sequence (for example, an implication/realization model or the like) in a song. Further, the information processing apparatus 100 may employ a method for extracting an important note sequence determined by, for example, a depth of a time span tree of generative theory of tonal music (GTTM).

In addition, the information processing apparatus 100 may extract information which is a lead sound, a chord sound, a chord type, a root of a chord, a bass line, and the like from the sounds constituting the song.

Further, the information processing apparatus 100 may extract strength information (velocity) in a certain section when a song is composed of MIDI information.

Further, the information processing apparatus 100 may extract sounds for each musical instrument constituting a song or for each musical instrument group. In addition, the information processing apparatus 100 may extract a style feature quantity or the like in which a correlation between features of a certain layer is calculated when features of a certain song are learned by a deep neural network (DNN). Further, the information processing apparatus 100 may extract self-similarity or the like in the song.

In addition, the information processing apparatus 100 may learn the features of the song and extract features based on the learned result. For example, the information processing apparatus 100 may learn a task of modulating a song with a sequence-to-sequence network (model), and sets conditions, such as modulation, for the decoder to extract features which are invariant with respect to the modulation.

2-3. Variation of Application

Figure 11:
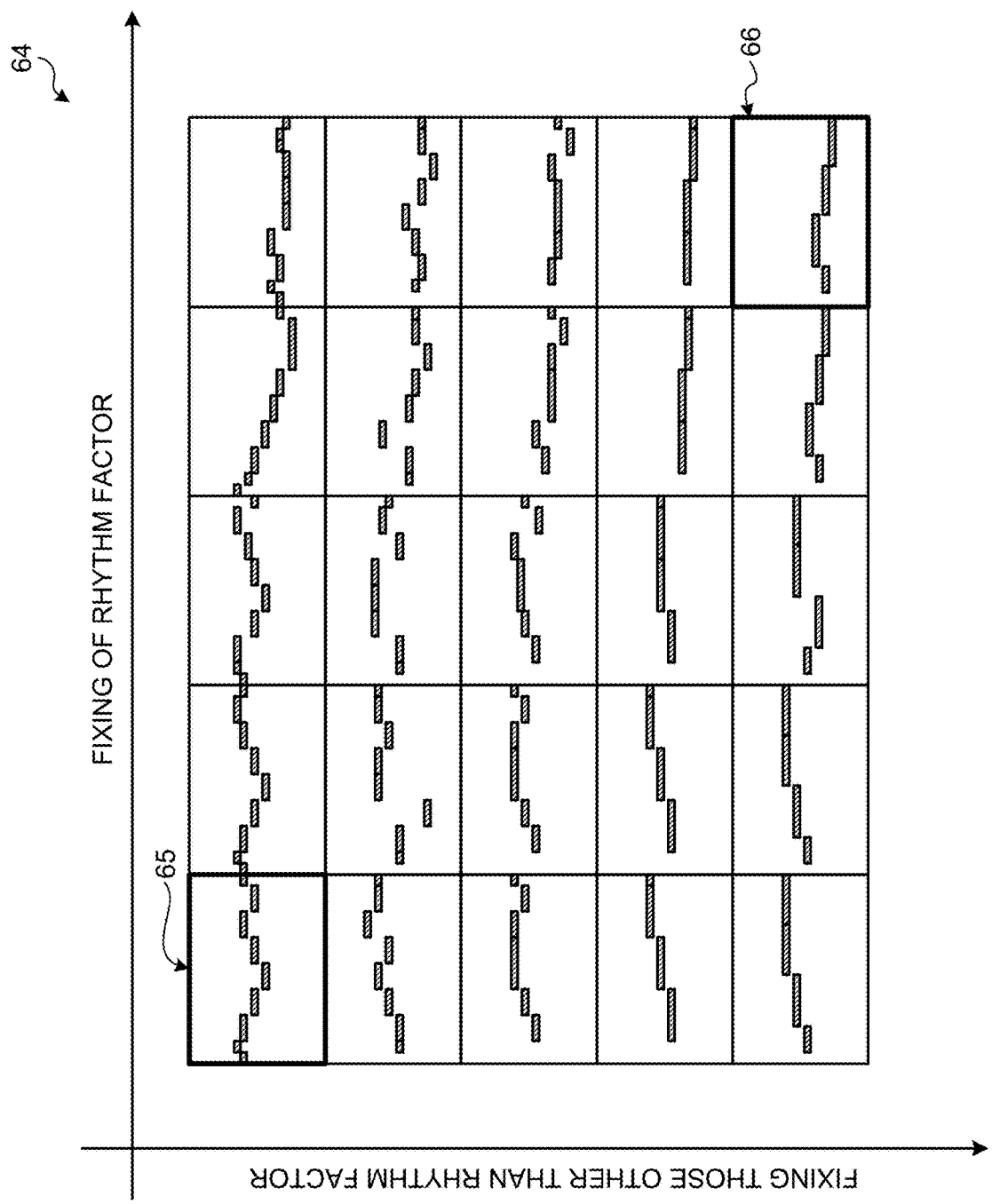
FIG. 11 is a diagram for conceptually describing the generation process according to the present disclosure.

As described in the above embodiment, according to the information processing according to the present disclosure, it is possible to perform learning in which predetermined features are separated, so the influence of features appearing in new content can be selectively increased or decreased. This will be described with reference to FIG. 11. FIG. 11 is a diagram for conceptually describing the generation processing according to the present disclosure.

FIG. 11 illustrates a graph 64 conceptually illustrating an image (pitch and sound length) of a song generated by the generation process according to the present disclosure. As described above, the information processing apparatus 100 can extract a rhythm as one of the features representing a song, and generate a new song reflecting the influence of fixing or changing the rhythm.

For example, when changing features other than the rhythm factor while fixing a factor (referred to as a "rhythm factor") that determines the rhythmic feature of the song, the information processing apparatus 100 generates a song along an axis of fixing the rhythm factor illustrated in FIG. 11. On the other hand, when the features other than the rhythm factor are fixed and the rhythm factor is changed, the information processing apparatus 100 generates the song along the axis of fixing other than the rhythm factor illustrated in FIG. 11.

In general, in the generation of content, when the feature quantity cannot be separated, some change can be given to the original data, but it is difficult to adjust the direction of the change. For example, the information processing apparatus 100 can generate a new song 66 by changing a feature quantity of a song 65 indicating sound information of 1 bar, but when the feature quantity is not separated, sets the direction in change to be one direction (so-called 1D-interpolation) on a diagonal line.

However, according to the information processing apparatus 100, since the elements such as the rhythm factor can be separated from the features of the song, the song 65 can be changed in a direction in which the rhythm factor is fixed and in a direction (so-called 2D-interpolation) in which elements other than the rhythm factor are fixed. For example, the information processing apparatus 100 can change the song 65 to images of the entire song illustrated in the graph 64 according to the user's request. As described above, the information processing apparatus 100 can generate new content so as to adjust a blend ratio of the feature quantity.

That is, the information processing apparatus 100 can generate new content or variations not only by fixing a rhythm or a degree of modulation of a song, a scale, and the like, but also by controlling the degree of change. As a specific method, the variation of the feature quantity can be generated by obtaining two noises and adding each noise to the two feature quantities $z_1$ and $z_2$. At this time, when the noise is scaled, the degree of variation can be controlled for each of the two feature quantities $z_1$ and $z_2$. For example, when there are two methods for obtaining noise, there is a method for (1) obtaining noise from a certain fixed distribution such as a normal distribution, and a method for (2) learning an encoder using VAE and using noise output from the encoder. In addition, the information processing apparatus 100 can perform a flexible generation process, such as generating new content by exchanging features of certain two songs.

2-4. Variation of Feature Quantity

In the above embodiment, an example has been described in which the information processing apparatus 100 learns two types of feature quantities (rhythm and elements other than the rhythm) in a song. However, the information processing apparatus 100 may learn two or more types of feature quantities.

This will be described with reference to FIG. 12. FIG. 12 is a diagram (1) illustrating an example of a learning process according to a fourth modification of the present disclosure. FIG. 12 conceptually illustrates feature quantities $z_o$, $z_a$, $z_b$, and $z_c$ separated in the learning process and variations in the relationship between the feature quantities.

A conceptual diagram 67 illustrated in FIG. 12(a) illustrates that three types of feature quantities each are a feature group that is an exclusive feature. A conceptual diagram 68 illustrated in FIG. 12(b) illustrates that four types of feature quantities each are a feature group which is a certain space of a common portion. A conceptual diagram 69 illustrated in FIG. 12(c) illustrates that three types of feature quantities are a feature group that is a nesting space.

Figure 13:
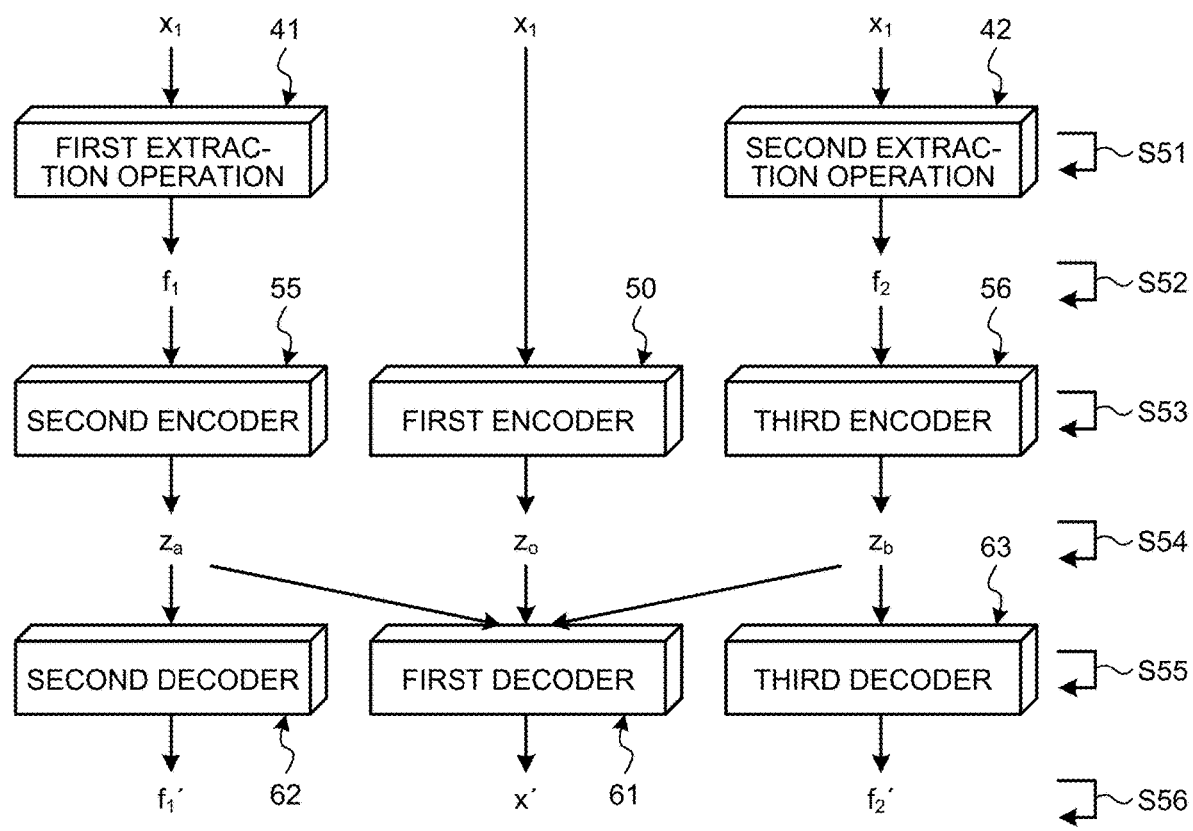
FIG. 13 is a diagram (2) illustrating an example of the learning process according to the fourth modification of the present disclosure.

FIG. 13 illustrates an example of learning the feature group illustrated in FIG. 12(a). FIG. 13 is a diagram (2) illustrating an example of a learning process according to a fourth modification of the present disclosure.

As illustrated in FIG. 13, the information processing apparatus 100 executes a first extraction operation 41 and a second extraction operation 42 on the data $x_1$ (step S51). Then, the information processing apparatus 100 obtains the feature information $f_1$ by the first extraction operation 41, and obtains the feature information $f_2$ by the second extraction operation 42 (step S52). Subsequently, the information processing apparatus 100 inputs the data $x_1$ to the first encoder 50, inputs the feature information $f_1$ to the second encoder 55, and inputs the feature information $f_2$ to the third encoder 56 (step S53).

The information processing apparatus 100 obtains the feature quantity $z_o$ from the first encoder 50, obtains the feature quantity $z_a$ from the second encoder 55, and obtains the feature quantity $z_b$ from the third encoder 56, respectively (step S54). Subsequently, the information processing apparatus 100 inputs the feature quantity $z_o$, the feature quantity $z_a$, and the feature quantity $z_b$ to the first decoder 61, the feature quantity $z_a$ to the second decoder 62, and the feature quantity $z_b$ to the third decoder 63, respectively (step S55). Then, the information processing apparatus 100 obtains the data x' from the first decoder 61, the feature information $f_1$' from the second decoder 62, and the feature information $f_2$' from the third decoder 63 (step S56). Subsequently, the information processing apparatus 100 optimizes the decoder and the encoder so that the data x' approaches the data $x_1$, the feature information $f_1$' approaches the feature information $f_1$, and the feature information $f_2$' approaches the feature information $f_2$, respectively.

With the configuration illustrated in FIG. 13, the information processing apparatus 100 can learn the feature group having the relationship illustrated in FIG. 12 (a). Note that as a specific example of the learning illustrated in FIG. 13, for example, the first decoder 61 executes a task related to the melody of the song, the second decoder 62 executes a task related to the rhythm of the melody of the song, and the third decoder 63 executes a task related to the melody constituent sound of the song. In other words, in the model illustrated in FIG. 13, it can be said that the second decoder 62 captures the feature quantity $z_a$, the third decoder 63 captures the feature quantity $z_b$, and the first decoder 61 captures other features.

Figure 14:
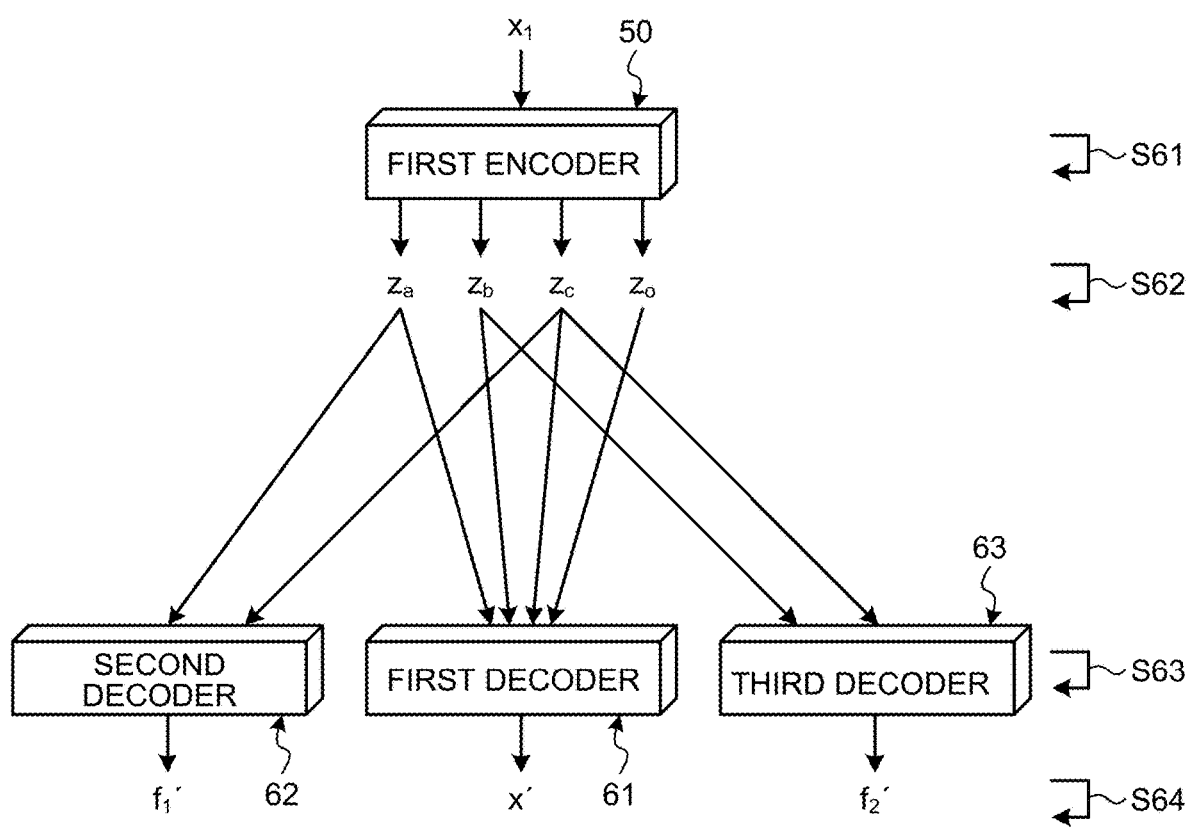
FIG. 14 is a diagram (3) illustrating an example of the learning process according to the fourth modification of the present disclosure.

Next, FIG. 14 illustrates an example of learning the feature group illustrated in FIG. 12 (b). FIG. 14 is a diagram (3) illustrating an example of a learning process according to a fourth modification of the present disclosure.

As illustrated in FIG. 14, the information processing apparatus 100 inputs the data $x_1$ to the first encoder 50 (step S61). Then, the information processing apparatus 100 outputs the feature quantities $z_o$, $z_a$, $z_b$, and $z_c$ from the first encoder 50 (step S62). Note that in this case, the information processing apparatus 100 may set a predetermined rule regarding the separation of the feature quantity in the same manner as in step S33 of FIG. 9 or the like.

Subsequently, the information processing apparatus 100 inputs the feature quantities $z_o$, $z_a$, $z_b$, and $z_c$ to the first decoder 61, the feature quantity $z_a$ and the feature quantity $z_c$ to the second decoder 62, and the feature quantities $z_b$ and $z_c$ to the third decoder 63, respectively (step S63). Such processing is based on the fact that feature quantity $z_c$ has features in common with the feature quantity $z_a$ and the feature quantity $z_b$, as illustrated in FIG. 12 (b).

Then, the information processing apparatus 100 obtains the data x' from the first decoder 61, the feature information $f_1'$ from the second decoder 62, and the feature information $f_2'$ from the third decoder 63 (step S56). Subsequently, the information processing apparatus 100 optimizes the decoder and the encoder so that the data x' approaches the data $x_1$, the feature information $f_1'$ approaches the feature information $f_1$, and the feature information $f_2'$ approaches the feature information $f_2$, respectively.

With the configuration illustrated in FIG. 14, the information processing apparatus 100 can learn the feature group having the relationship illustrated in FIG. 12 (b).

Figure 15:
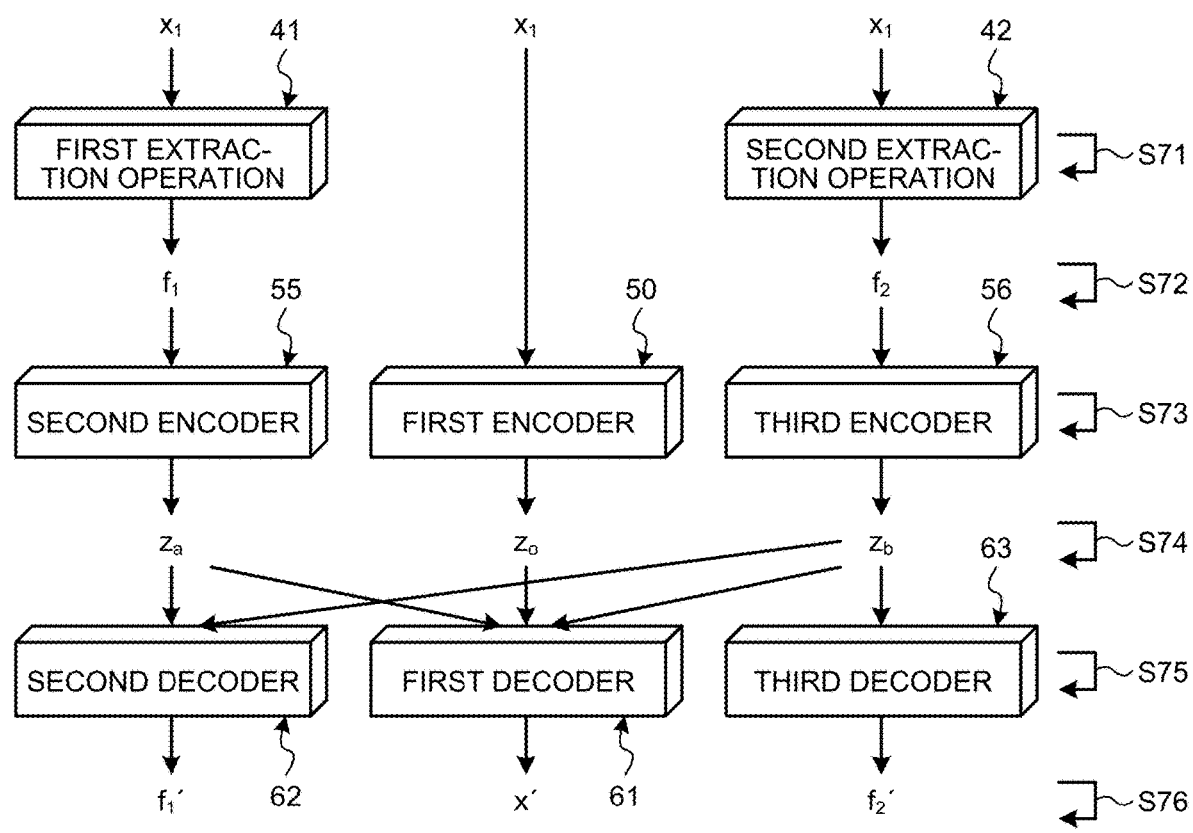
FIG. 15 is a diagram (4) illustrating an example of the learning process according to the fourth modification of the present disclosure.

Next, FIG. 15 illustrates an example of learning the feature group illustrated in FIG. 12(c). FIG. 15 is a diagram (4) illustrating an example of a learning process according to a fourth modification of the present disclosure.

In the processing illustrated in FIG. 15, steps S71 to S74 are common to steps S51 to S54 illustrated in FIG. 13, and thus a description thereof will be omitted.

The information processing apparatus 100 inputs the feature quantity $z_o$, the feature quantity $z_a$, and the feature quantity $z_b$ obtained in step S74 to the first decoder 61, the feature quantity $z_a$ and the feature quantity $z_b$ to the second decoder 62, and the feature quantity $z_b$ to the third decoder 63, respectively (step S75). As illustrated in FIG. 12(c), such processing is based on the fact that feature quantity $z_b$ has a nesting structure with the feature quantity $z_a$ and the feature quantity $z_o$.

Then, the information processing apparatus 100 obtains the data x' from the first decoder 61, the feature information $f_1'$ from the second decoder 62, and the feature information $f_2'$ from the third decoder 63, respectively (step S76). Subsequently, the information processing apparatus 100 optimizes the decoder and the encoder so that the data x' approaches the data $x_1$, the feature information $f_1'$ approaches the feature information $f_1$, and the feature information $f_2'$ approaches the feature information $f_2$, respectively.

With the configuration illustrated in FIG. 15, the information processing apparatus 100 can learn the feature group having the relationship illustrated in FIG. 12(c). As described with reference to FIGS. 12 to 15, the information processing apparatus 100 can perform learning by separating each feature even when a plurality of feature quantities (feature groups) have various relationships.

2-5. Variation of Information Processing

When there is a dependency relationship between two feature quantities (for example, feature quantity $z_1$ and feature quantity $z_2$), the information processing apparatus 100 may be dependent on the encoder or the prior distribution used for each processing.

Further, the information processing apparatus 100 may share an embedding vector (embedding) in two passes of the encoder. For example, when the information processing apparatus 100 performs learning by extracting a constituent sound or the like of a song, the information processing apparatus 100 shares the embedding vector in two passes of the encoder.

Further, the information processing apparatus 100 may separate the feature quantity using hostile learning. Specifically, the information processing apparatus 100 may learn an identifier that classifies the feature quantity $z_2$ and the noise of the normal distribution in order to separate two feature quantities (for example, feature quantity $z_1$ and feature quantity $z_2$), and may perform the hostile learning such as learning feature quantity $z_1$ so that the identification becomes impossible.

2-6. Variation of Model Structure

Figure 16:
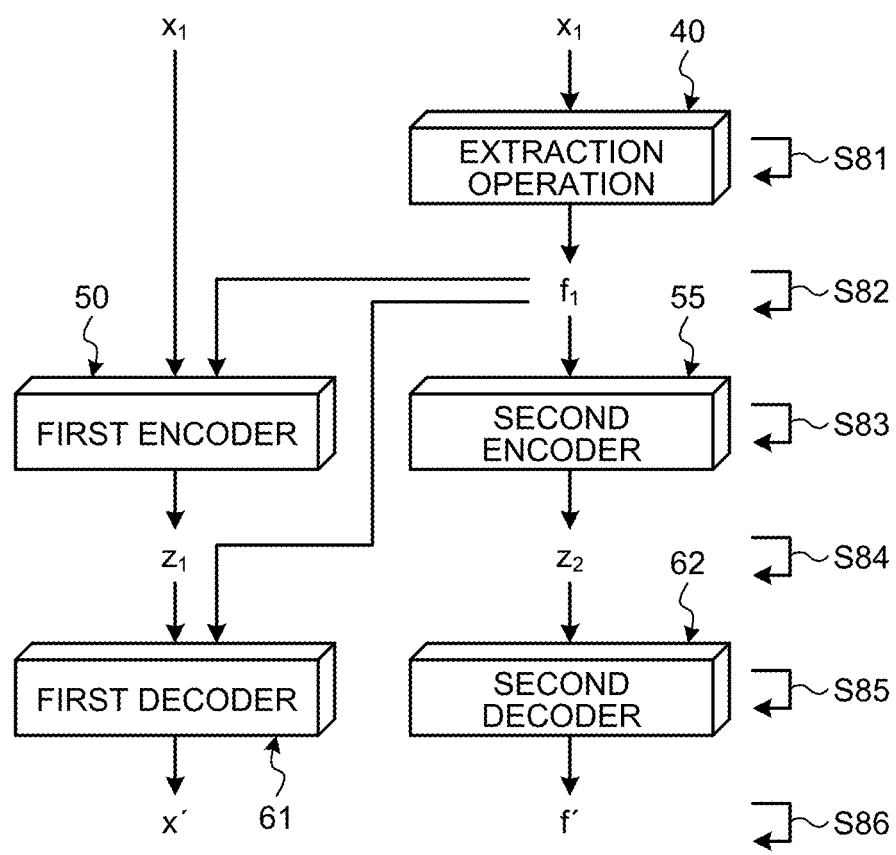
FIG. 16 is a diagram illustrating an example of learning process according to a fifth modification of the present disclosure.

The information processing apparatus 100 may learn a model having a further different structure with respect to the handling of the feature quantity or the feature information. This will be described below with reference to FIG. 16. FIG. 16 is a diagram illustrating an example of a learning process according to a fifth modification of the present disclosure.

In the example illustrated in FIG. 16, the information processing apparatus 100 executes the extraction operation 40 on the data $x_1$ (step S81), and extracts the feature information $f_1$ (step S82). Thereafter, the information processing apparatus 100 inputs the feature information $f_1$ to the first encoder 50 together with the data $x_1$, and inputs the feature information $f_1$ to the second encoder 55 (step S83). Thereby, the information processing apparatus 100 obtains the feature quantity $z_1$ and the feature quantity $z_2$ (step S84).

Subsequently, the information processing apparatus 100 inputs the feature quantity $z_1$ and the feature information $f_1$ to the first decoder 61, and inputs the feature quantity $z_2$ to the second decoder 62 (step S85) Then, the information processing apparatus 100 obtains the data x' from the first decoder 61, and obtains the feature information f' from the second decoder 62 (step S86).

Thereafter, the information processing apparatus 100 adjusts the parameters of each encoder and decoder so that the data x' approaches the data $x_1$ and the feature information f' approaches the feature information $f_1$. That is, the information processing apparatus 100 performs model optimization processing.

As described above, the information processing apparatus 100 may generate a learned model that has the first decoder 61 that decodes the data corresponding to the first content (data $x_1$) based on the first feature quantity (feature quantity $z_1$) and the first data (feature information $f_1$) and the second decoder 62 that decodes the data (feature information f') corresponding to the first data based on the second feature quantity (feature quantity $z_2$).

Specifically, unlike the model or the like illustrated in FIG. 8, the information processing apparatus 100 inputs the feature information $f_1$ to the first decoder 61 in step S85. Thereby, the information processing apparatus 100 can perform the learning of the encoder and the decoder after conditioning the feature information $f_1$. That is, the information processing apparatus 100 can perform the learning including the feature information $f_1$, thereby excluding the uncertainty related to the feature information $f_1$. Specifically, the information processing apparatus 100 can perform the learning including the feature information $f_1$ in advance, so it is possible to prevent the situation where the learning that separates the feature quantity is not performed (for example, only the rhythm information of the song is extracted as the feature quantity, and the like) for some factors.

More specifically, according to the structure of the model in FIG. 16, the uncertainty of the feature information $f_1$ is not learned for the feature quantity $z_1$, and only the uncertainty of the portion of the data $x_1$ other than the feature information $f_1$ is learned. In other words, a space irrelevant to the feature information $f_1$ is learned for the feature quantity $z_1$. On the other hand, the space related to feature information $f_1$ is learned by the other encoder (in the example of FIG. 16, the second encoder 55). As a result, the feature quantity $z_1$ and the feature quantity $z_2$ are learned as a clearly separated space. That is, according to the learning process according to the fifth modification, the information processing apparatus 100 can improve learning stability.

Figure 17:
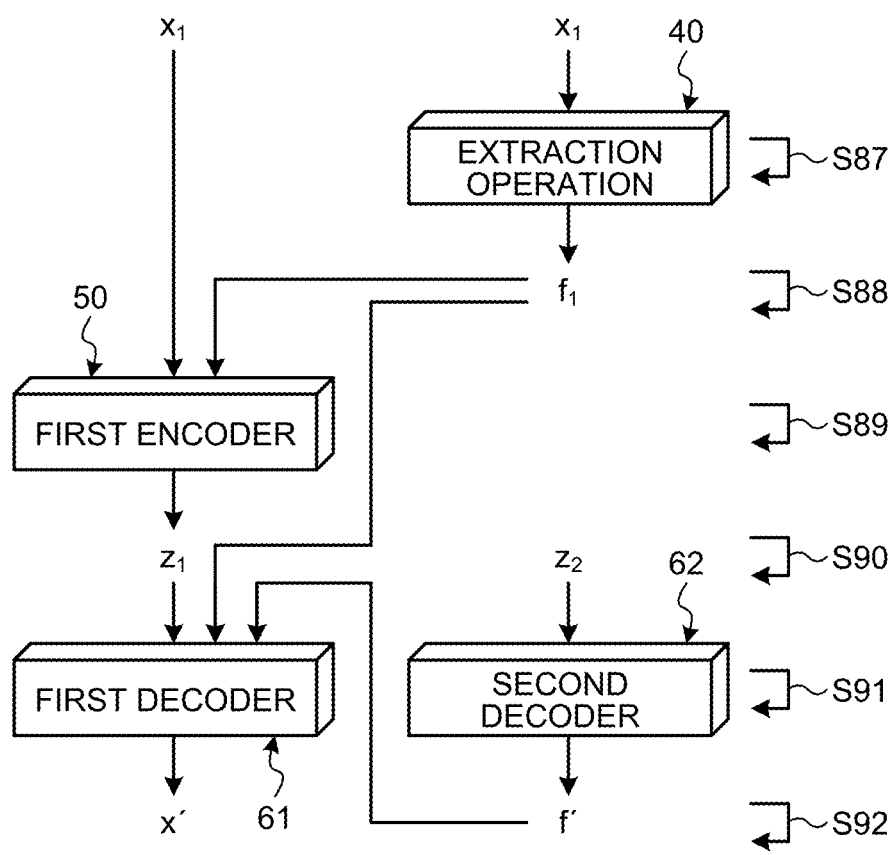
FIG. 17 is a diagram (1) illustrating an example of a generation process according to the fifth modification of the present disclosure.

Next, a modification of the generation process in a case of generating new content will be described with reference to FIG. 17. FIG. 17 is a diagram (1) illustrating an example of a generation process according to a fifth modification of the present disclosure.

FIG. 17 illustrates a flow of a process upon generating new content from the learned first encoder 50, first decoder 61, and second decoder 62. Note that the first encoder 50, the first decoder 61, and the second decoder 62 are, for example, an encoder and a decoder whose parameters have been learned through learning in FIG. 16.

The information processing apparatus 100 executes the extraction operation 40 on the arbitrary data $x_1$ (step S87), and extracts feature information $f_1$ (step S88). Thereafter, the information processing apparatus 100 inputs the feature information $f_1$ to the first encoder 50 together with the data $x_1$ (step S89). As a result, the information processing apparatus 100 obtains the feature quantity $z_1$ (step S90). In addition, the information processing apparatus 100 obtains the arbitrary feature quantity $z_2$ by sampling the pre-learned feature quantity (space) from the distribution of the pre-learned feature quantity (space).

Subsequently, the information processing apparatus 100 inputs the obtained feature quantity $z_2$ to the second decoder 62 (step S91), and inputs the obtained feature information f', feature quantity $z_1$, and feature information $f_1$ to the first decoder 61 (step S91). Thereby, the information processing apparatus 100 obtains the data x' which is new content (step S92).

With the configuration in FIG. 17, the information processing apparatus 100 can generate the data x' as new content reflecting the influence of the feature (feature information $f_1$ in the example of FIG. 17) extracted by the extraction operation.

Note that the information processing apparatus 100 may employ a further different configuration in generation. This will be described with reference to FIG. 18.

Figure 18:
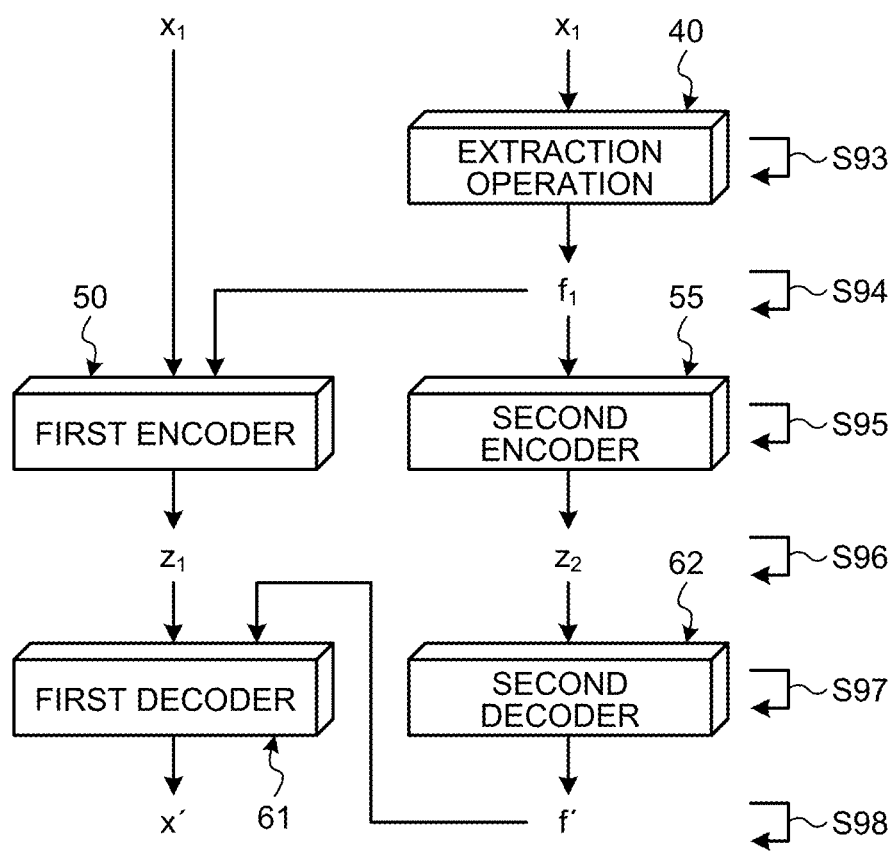
FIG. 18 is a diagram (2) illustrating an example of the generation process according to the fifth modification of the present disclosure.

FIG. 18 illustrates a flow of a process upon generating new content from the learned first encoder 50, second encoder 55, first decoder 61, and second decoder 62. Note that the first encoder 50, the second encoder 55, the first decoder 61, and the second decoder 62 are, for example, an encoder and a decoder whose parameters have been learned through the learning in FIG. 16.

The information processing apparatus 100 executes the extraction operation 40 on the arbitrary data $x_1$ (step S93), and extracts the feature information $f_1$ (step S94). Thereafter, the information processing apparatus 100 inputs the feature information $f_1$ to the first encoder 50 together with the data $x_1$, and inputs the feature information $f_1$ to the second encoder 55 (step S95). Thereby, the information processing apparatus 100 obtains the feature quantity $z_1$ from the first encoder 50 and the feature quantity $z_2$ from the second encoder 55 (step S96). At this time, the information processing apparatus 100 may obtain the arbitrary feature quantity $z_1$ by sampling the pre-learned feature quantity (space) from the distribution of the pre-learned feature quantity (space).

Subsequently, the information processing apparatus 100 inputs the obtained feature quantity $z_2$ to the second decoder 62 (step S97), and inputs the obtained feature information f' and feature quantity $z_1$ to the first decoder 61. Thereby, the information processing apparatus 100 obtains the data x' which is new content (step S98).

With the configuration in FIG. 18, the information processing apparatus 100 can generate the data x' as new content reflecting the influence of the feature (feature information $f_1$ in the example of FIG. 18) extracted by the extraction operation.

2-7. Variation of Content

In the above embodiment, examples of the content include a song (music). Here, the information processing apparatus 100 according to the modification may perform the information processing according to the present disclosure using an image, text data, and the like as content.

Figure 19:
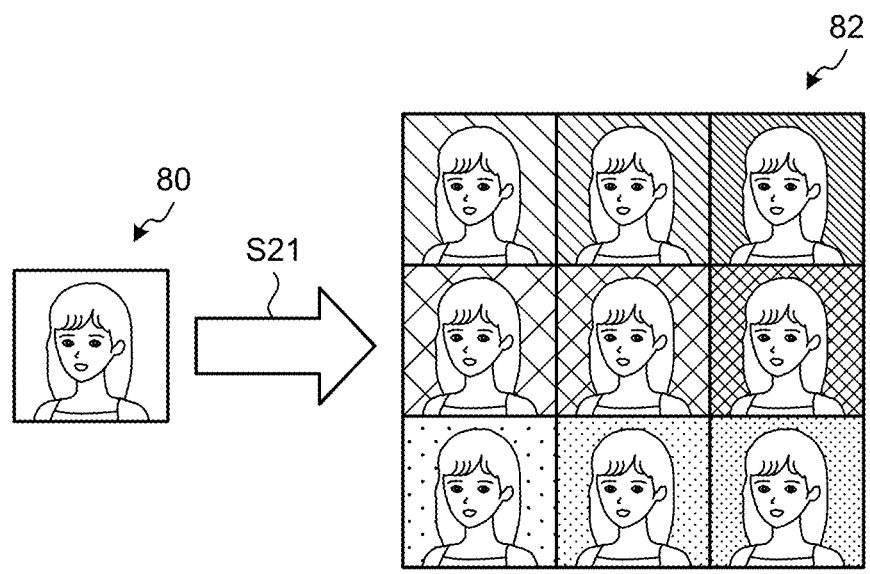
FIG. 19 is a diagram (1) illustrating an example of information processing according to a sixth modification of the present disclosure.

An example in which the information processing apparatus 100 handles the images as content will be described with reference to FIGS. 19 to 21. FIG. 19 is a diagram (1) illustrating an example of information processing according to a sixth modification of the present disclosure.

When handling an image as content, the information processing apparatus 100 performs, for example, an operation of extracting high-resolution information or low-resolution information from the image.

For example, it is assumed that the information processing apparatus 100 learns an image 80 illustrated in FIG. 19 as content and generates a learned model. It is assumed that the number of pixels constituting the image 80 is "128×128 pixels". In this case, each pixel information is pooled in a rough range occupying a certain size such as "32×32 pixels" in the image 80. Thereby, the low-resolution image (image obtained by performing mosaic processing on the image 80) in which the image 80 is represented by one pixel for each "32×32 pixels" is obtained.

Then, the information processing apparatus 100 learns original data of the image 80 with the first encoder 50 and learns the low-resolution image with the second encoder 55. Then, the feature quantity $z_1$ output from the first encoder 50 is a feature quantity indicating a feature in a range smaller than 32×32 pixels. On the other hand, the feature quantity $z_2$ output from the second encoder 55 is a feature quantity indicating a feature in a wider range other than the feature indicated by the feature quantity $z_1$.

For example, the feature represented by 32×32 pixels in the image 80 does not correspond to a person, but corresponds to a wide range of colors such as a background. On the other hand, the feature indicated in the range smaller than 32×32 pixels in the image 80 corresponds to, for example, information or the like that features a smaller range such as parts of a person's eyes and nose.

For this reason, the information processing apparatus 100 changes the feature quantity $z_2$ while fixing the feature quantity $z_1$ (for example, sampling the feature quantity $z_2$ with the prior distribution while fixing the feature quantity $z_1$), and when a plurality of second contents are generated, an image group 82 illustrated in FIG. 19 can be generated. Each image included in the image group 82 illustrated in FIG. 19 is an image in which fine parts such as a person's eyes or nose included in the image 80 is hardly changed, and only a background color and the ambient light is changed.

The image group 82 generated in this way means a plurality of images obtained by imaging the same person under various backgrounds and environments. That is, according to the information processing apparatus 100, it is possible to obtain, from one image 80 obtained by imaging a certain person, a number of images equivalent to those obtained by imaging the same person under different environments. Thereby, the information processing apparatus 100 can obtain a large number of images useful for generating a machine learning model (for example, a classifier of a face recognition or facial expression recognition, or the like) that performs specific processing from a very small number of original images. In other words, the information processing apparatus 100 can inflate an image used for learning in an appropriate form.

Further, the information processing apparatus 100 can perform learning differently from that in FIG. 19. An example of different learning will be described with reference to FIG. 20. FIG. 20 is a diagram (2) illustrating an example of the information processing according to the sixth modification of the present disclosure.

As the original data of the learning, the same image 80 as that in FIG. 19 is used. In the example of FIG. 20, each pixel information is pooled in a range occupying a smaller range as compared with FIG. 19, such as "8×8 pixels" of the image 80.

Then, the information processing apparatus 100 learns the original data of the image 80 with the first encoder 50 and learns the pooled image with the second encoder 55. Then, the feature quantity $z_1$ output from the first encoder 50 is a feature quantity indicating a feature in a range smaller than 8×8 pixels. On the other hand, the feature quantity $z_2$ output from the second encoder 55 is a feature quantity indicating a feature in a wider range other than the feature indicated by the feature quantity $z_1$.

For example, the feature indicated in the range smaller than 8×8 pixels in the image 80 corresponds to, for example, information or the like that features a smaller range such as parts of a person's eyes and nose.

Figure 20:
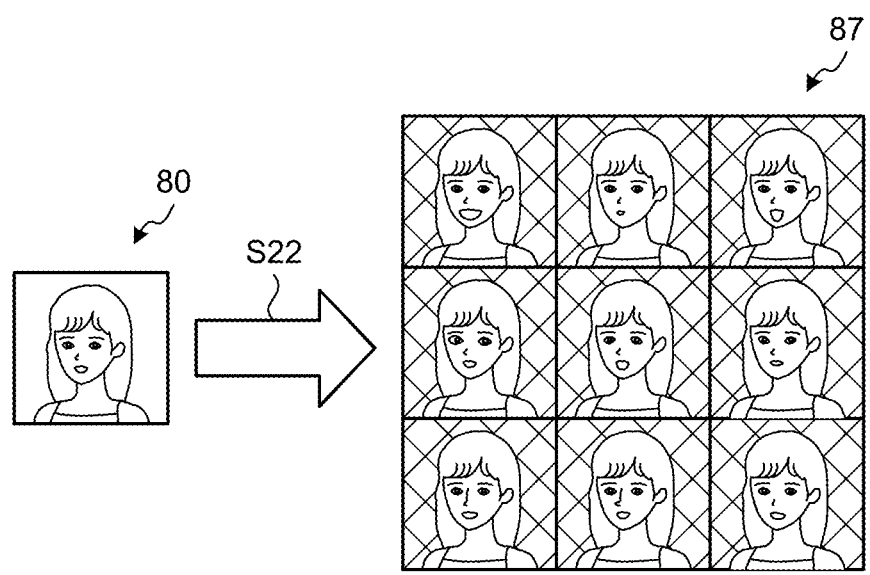
FIG. 20 is a diagram (2) illustrating the example of information processing according to the sixth modification of the present disclosure.
Figure 21:
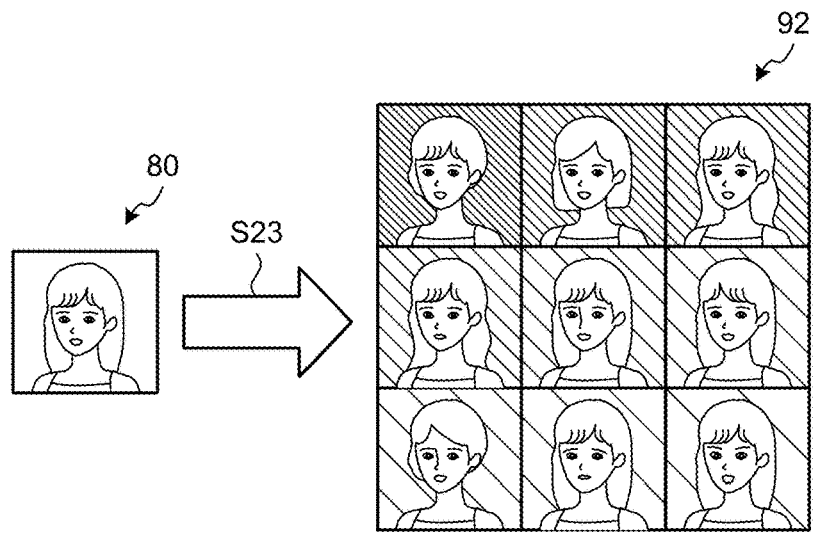
FIG. 21 is a diagram (3) illustrating the example of information processing according to the sixth modification of the present disclosure.

In the example of FIG. 20, the information processing apparatus 100 changes the feature quantity $z_1$ while fixing the feature quantity $z_2$ (for example, sampling the feature quantity $z_1$ with the prior distribution while fixing the feature quantity $z_2$), and when a plurality of second contents are generated, an image group 87 illustrated in FIG. 20 can be generated. Unlike FIG. 19, each image included in the image group 87 illustrated in FIG. 20 is an image in which the background color or the ambient light is hardly changed and fine parts such as a person's eyes or nose included in the image 80 are changed.

The image group 87 generated in this manner can be, for example, a large number of images useful for generating a highly accurate face recognition model. That is, when a person captured in the image 80 is finely changed, it is possible to use the image group 87 to generate a model that makes a determination not to recognize a person who was erroneously captured in the image 80. Thereby, the information processing apparatus 100 can improve the performance of the facial recognition model.

Note that the information processing apparatus 100 can use a further different learning method. This will be described with reference to FIG. 21. FIG. 21 is a diagram (3) illustrating an example of the information processing according to the sixth modification of the present disclosure.

As the original data of the learning, the same image 80 as that in FIG. 19 is used. Here, in the example of FIG. 21, the second encoder 55 is learned using data appearing in an intermediate layer while encoding the image 80. For example, the information processing apparatus 100 performs a global average pooling (GAP) operation on the data (for example, data of 4×4 pixels) of the intermediate layer of the second encoder 55, and learns the second encoder 55 so as to output the feature quantity $z_2$. Thereby, in the feature quantity $z_2$, the image 80 from which the location information (background and the like) has disappeared is learned, and in the feature quantity $z_1$, the location information is learned. In this case, it is possible to operate those other than the location information in the image by fixing the feature quantity $z_1$ and sampling the feature quantity $z_2$. For example, as illustrated in FIG. 21, an image group 92 in which the rough atmosphere of the background is maintained, but a person's face or hairstyle of the person included in the image is variously different is generated. In other words, the information processing apparatus 100 can generate various images including various people with changed featured attributes (alignment) of the face. According to such processing, the information processing apparatus 100 can generate a large number of learning images labeled by a "person" from, for example, one image.

As described above, the information processing apparatus 100 may perform the extraction operation on the digital data constituting the first content, which is an image, and extract the first data. For example, the information processing apparatus 100 extracts the first data by performing operation processing (for example, pooling) with order invariance on pixel information of each pixel included in a specific region of the image as the extraction operation.

As described above, even when the content is not a song but an image, the information processing apparatus 100 can perform learning in which features targeted by the user are separated. In addition, the information processing apparatus 100 can use the generated learned model to automatically generate an image that maintains features designated by the user, such as an image in which certain features (such as a background or a human face) are fixed and other features are changed.

In addition, the information processing apparatus 100 may use text data, a moving image, and the like as content. That is, the information processing apparatus 100 can perform learning to separate the targeted feature quantity if it is possible to learn the information extracted by some operation and the original content data by separate encoders, regardless of the type of content.

Further, the information processing apparatus 100 may apply the information processing according to the present disclosure to perform processing of detecting a substance or the like emitting a similar taste based on human taste information. For example, the information processing apparatus 100 separates elements having a certain taste from a specific substance, and inputs information obtained by digitalizing each of the elements to separate encoders, thereby learning features obtained by separating only the features of a specific taste from a certain substance.

In addition, in the above embodiment, an example has been described in which the information processing apparatus 100 performs an operation of extracting the feature information by performing a certain operation with order invariance or losing certain information. However, the extraction operation is not limited to this example. For example, the information processing apparatus 100 learns a supervised regression function such as which phrase has a higher "degree of excitement" based on the "degree of excitement in a song" artificially set in advance for each bar of the song. Then, the information processing apparatus 100 calculates the degree of excitement of each bar of the song to be processed based on the learned result. Then, the information processing apparatus 100 extracts only a bar whose degree of excitement exceeds a predetermined threshold value, and learns the extracted bar with the second encoder 55. Thereby, the information processing apparatus 100 can generate a learned model that can separate artificially set features such as the "degree of excitement".

That is, the information processing apparatus 100 does not necessarily extract the feature information from the content by an arithmetic operation, but can also extract the feature information from the content based on the artificially set features. With such a configuration, for example, since features corresponding to an emotion can be separated, it is possible to automatically generate, for example, content having some features felt by a human, such as content causing a happy emotion. As an example, the information processing apparatus 100 applies such a configuration to natural language processing to automatically generate content (sentences) having features that recall certain emotions, such as "sentences that cause happy emotions".

2-8. Others

Further, among each process described in the above embodiments, all or a part of the processes described as being performed automatically may be manually performed or the processes described as being performed manually can be performed automatically by the known method. In addition, the processing procedures, specific names, and information including various data and parameters illustrated in the above documents and drawings can be arbitrarily changed unless otherwise specified. For example, various information illustrated in each drawing is not limited to the information illustrated.

In addition, each component of each device illustrated is a functional concept, and does not necessarily need to be physically configured as illustrated. That is, the specific form of distribution/integration of each device is not limited to the those illustrated in the drawings, and all or a part thereof may be functionally or physically distributed/integrated into arbitrary units according to various loads and usage conditions.

Further, the above-described embodiments and modifications can be appropriately combined within a range that does not contradict processing contents.

In addition, the effects described in the present specification are merely illustrative and not limited to the illustration and additional effects may be present.

3. Hardware Configuration

Figure 22:
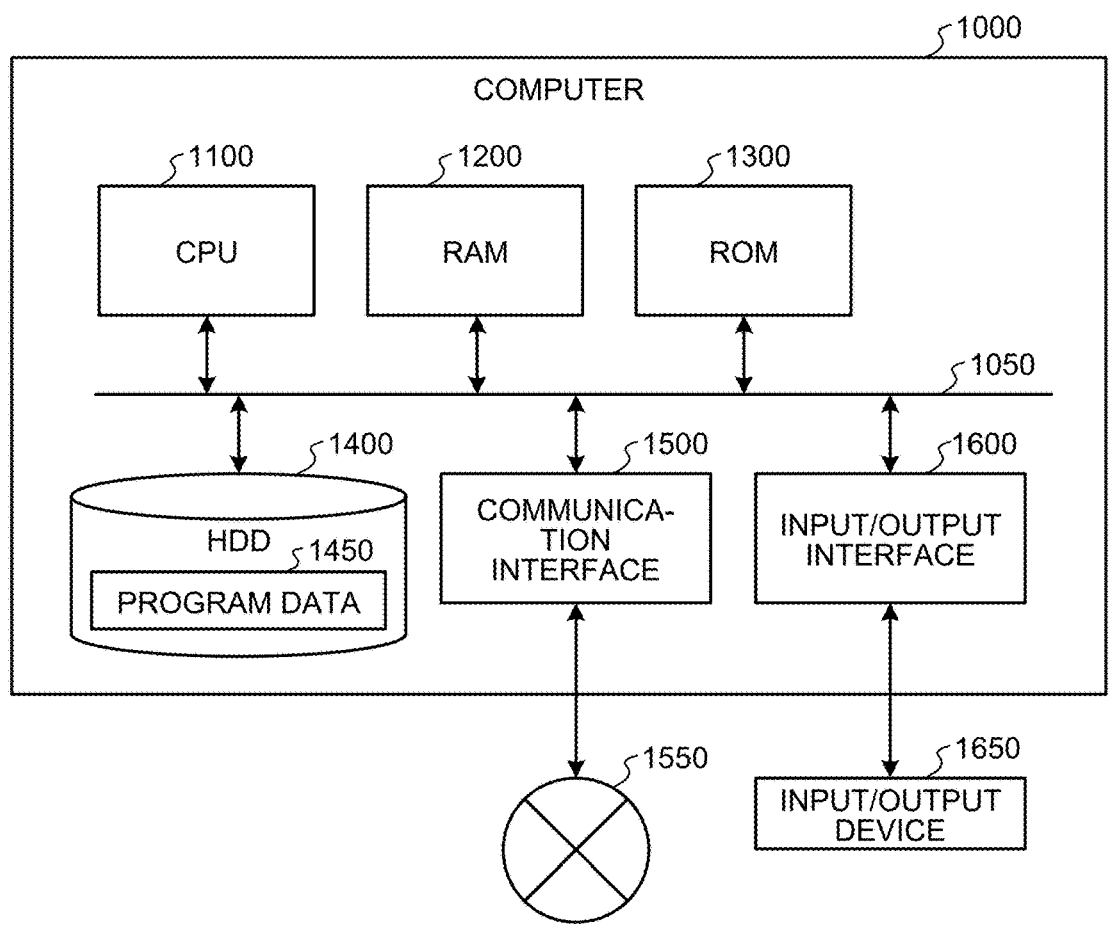
FIG. 22 is a hardware configuration diagram illustrating an example of a computer that realizes a function of an information processing apparatus.

Information devices such as the information processing apparatus 100 according to each embodiment described above are implemented by, for example, a computer 1000 having the configuration as illustrated in FIG. 11. Hereinafter, the information processing apparatus 100 according to the embodiment will be described as an example. FIG. 22 is a hardware configuration diagram illustrating an example of the computer 1000 that implements the functions of the information processing apparatus 100. The computer 1000 includes a CPU 1100, a RAM 1200, a read only memory (ROM) 1300, a hard disk drive (HDD) 1400, a communication interface 1500, and an input/output interface 1600. Each part of the computer 1000 is connected by a bus 1050.

The CPU 1100 is operated based on a program stored in the ROM 1300 or the HDD 1400, and controls each unit. For example, the CPU 1100 develops a program stored in the ROM 1300 or the HDD 1400 into the RAM 1200 and executes processes corresponding to various programs.

The ROM 1300 stores a boot program such as a basic input output system (BIOS) executed by the CPU 1100 when the computer 1000 starts up, a program depending on hardware of the computer 1000, and the like.

The HDD 1400 is a computer-readable recording medium that non-temporarily records a program executed by the CPU 1100, data used by the program, and the like. Specifically, the HDD 1400 is a recording medium that records an information processing program according to the present disclosure, which is an example of the program data 1450.

The communication interface 1500 is an interface for connecting the computer 1000 to an external network 1550 (for example, the Internet). For example, the CPU 1100 receives data from other devices or transmits data generated by the CPU 1100 to the other devices via the communication interface 1500.

The input/output interface 1600 is an interface for connecting between the input/output device 1650 and the computer 1000. For example, the CPU 1100 receives data from an input device such as a keyboard or a mouse via the input/output interface 1600. In addition, the CPU 1100 transmits data to an output device such as a display, a speaker, or a printer via the input/output interface 1600. Further, the input/output interface 1600 may function as a media interface for reading a program or the like recorded on predetermined recording media. The media are, for example, optical recording media such as a digital versatile disc (DVD) or a phase change rewritable disk (PD), a magneto-optical recording medium such as a magneto-optical disk (MO), a tape medium, a magnetic recording medium, a semiconductor memory, or the like.

For example, when the computer 1000 functions as the information processing apparatus 100 according to the embodiment, the CPU 1100 of the computer 1000 implements the functions of the control unit 130 and the like by executing the information processing program loaded on the RAM 1200. Further, the HDD 1400 stores the information processing program according to the present disclosure or data in the storage unit 120. Note that the CPU 1100 reads and executes the program data 1450 from the HDD 1400, but as another example, the CPU 1100 may acquire these programs from other devices via the external network 1550.

Note that the present technology can also be configured as follows.

(1)

An information processing apparatus, comprising:
an extraction unit that extracts first data from an element constituting first content; and
a model generation unit that generates a learned model that has a first encoder that calculates a first feature quantity as a feature quantity of the first content, and a second encoder that calculates a second feature quantity as a feature quantity of the extracted first data.

(2)

The information processing apparatus according to (1), wherein
the model generation unit
generates the learned model that has a decoder that decodes data corresponding to the first content based on the first feature quantity and the second feature quantity.

(3)

The information processing apparatus according to (1) or (2), wherein
the extraction unit
receives an operation specified by a user for the first content and a designation of a range in which the operation is executed, and executes the operation on the received range.

(4)

The information processing apparatus according to (3), wherein the extraction unit extracts the first data by performing operation processing with order invariance on the element included in the range as the operation.

(5)

The information processing apparatus according to (3) or (4), wherein the extraction unit extracts, from the element included in the range, the first data by losing time-independent or order-independent information.

(6)

The information processing apparatus according to any one of (3) to (5), wherein the extraction unit executes the operation on digital data constituting the first content as a song, and extracts the first data.

(7)

The information processing apparatus according to (6), wherein the extraction unit executes the operation of losing information on a height of a sound of sound information included in the range, and extracts the first data from the first content.

(8)

The information processing apparatus according to any one of (3) to (5), wherein the extraction unit executes the operation on digital data constituting the first content as an image, and extracts the first data.

(9)

The information processing apparatus according to (8), wherein the extraction unit extracts the first data by performing operation processing with order invariance on pixel information of each pixel included in a specific region of the image, as the operation.

(10)

The information processing apparatus according to any one of (2) to (9), further comprising:

a content generation unit that generates second content as new content having the same format as the first content by inputting to the decoder a feature quantity output from a learned first encoder or second encoder or values obtained by combining any of feature quantities generated based on the feature quantity.

(11)

The information processing apparatus according to (10), wherein the content generation unit generates the second content by inputting to the decoder values obtained by combining the feature quantity output from the learned first encoder with the feature quantity output from the learned second encoder.

(12)

The information processing apparatus according to (10) or (11), wherein the content generation unit generates a plurality of the second contents in order by fixing a value corresponding to any of the feature quantities among the combined values and changing values corresponding to other feature quantities in order.

(13)

An information processing method, comprising:

allowing a computer to extract first data from an element constituting first content, and generate a learned model that has a first encoder that calculates a first feature quantity as a feature quantity of the first content, and a second encoder that calculates a second feature quantity as a feature quantity of the extracted first data.

(14)

A program for executing a computer to function as an extraction unit that extracts first data from an element constituting first content; and a model generation unit that generates a learned model that has a first encoder that calculates a first feature quantity as a feature quantity of the first content, and a second encoder that calculates a second feature quantity as a feature quantity of the extracted first data.

(15)

The information processing apparatus according to any one of (1) or (3) to (12), in which the model generation unit generates a learned model that has a first decoder that decodes data corresponding to the first content based on the first feature quantity and the second feature quantity, and a second decoder that decodes data corresponding to the first data based on the second feature quantity.

(16)

The information processing apparatus according to any one of (1) or (3) to (12), in which the model generation unit generates a learned model that has a first decoder that decodes data corresponding to the first content based on the first feature quantity and the first data, and a second decoder that decodes data corresponding to the first data based on the second feature quantity.

REFERENCE SIGNS LIST

100 Information processing apparatus
110 Communication unit
120 Storage unit
121 Model storage unit
122 Song data storage unit
130 Control unit
131 Extraction unit
132 Model generation unit
133 Acquisition unit
134 Content generation unit

The invention claimed is:

1. An information processing apparatus, comprising:
circuitry configured to:
receive a user input identifying a feature of a first audio content to be replaced by a feature of a second audio content different from the first audio content;
process the first and second audio content with an optimized first and second learned model, respectively;
wherein the optimized first learned model generates:
a first vector of the first audio content that represents the first audio content without the feature of the first audio content, and
a second vector of the first audio content that represents the identified feature of the first audio content;

wherein the optimized second learned model generates:
   a first vector of the second audio content that represents the second audio content without the feature of the second audio content, and
   a second vector of the second audio content that represents the feature of the second audio content;
generate a third audio content by merging the first vector of the first audio content with the second vector of the second audio content,
wherein the second vector of the first audio content and the second vector of the second audio content have equal dimensions,
wherein the optimized first learned model is generated by:
   using an initial first learned model to:
      perform an extraction process on the first audio content to separate the feature of the first audio content from a remainder of the first audio content corresponding to the first audio content without the feature of the first audio content,
      encode the remainder of the first audio content with a first encoder, and encode the feature of the first audio content with a second encoder,
      output the encoded remainder of the first audio content and the encoded feature of the first audio content to a common decoder to reconstitute the first audio content, and
      output the reconstituted first audio content which comprises the decoded remainder of the first audio content and the decoded feature of the first audio content,
   adjusting a parameter of at least one of the first encoder, second encoder or decoder to reduce a difference between the first audio content and the reconstituted first audio content,
   updating the initial first learned model based on the adjusted parameter to create the optimized first learned model, and
   storing the optimized first learned model,
wherein the optimized second learned model is generated by:
   using an initial second learned model to:
      perform an extraction process on the second audio content to separate the feature of the second audio content from a remainder of the second audio content corresponding to the second audio content without the feature of the second audio content,
      encode the remainder of the second audio content with the first encoder, and encode the feature of the second audio content with the second encoder,
      output the encoded remainder of the second audio content and the encoded feature of the second audio content to the common decoder to reconstitute the second audio content, and
      output the reconstituted second audio content which comprises the decoded remainder of the second audio content and the decoded feature of the second audio content,
   adjusting a parameter of at least one of the first encoder, second encoder or decoder to reduce a difference between the second audio content and the reconstituted second audio content,
   updating the initial second learned model based on the adjusted parameter to form the optimized second learned model, and
   storing the optimized second learned model.

2. The information processing apparatus of claim 1, wherein the feature of the first audio content comprises an order-variable feature of the first audio content and the feature of a second audio content comprises an order-variable feature of the second audio content.

3. The information processing apparatus of claim 2, wherein the order-variable feature of the first audio content comprises a rhythm of the first audio content, and the order-variable feature of the second audio content comprises a rhythm of the second audio content.

4. An information processing method performed by a computing device, the method comprising:
   receiving a user input identifying a feature of a first audio content to be replaced by a feature of a second audio content different from the first audio content;
   processing the first and second audio content with an optimized first and second learned model, respectively;
   wherein the optimized first learned model generates:
      a first vector of the first audio content that represents the first audio content without the feature of the first audio content, and
      a second vector of the first audio content that represents the identified feature of the first audio content;
   wherein the optimized second learned model generates:
      a first vector of the second audio content that represents the second audio content without the feature of the second audio content, and
      a second vector of the second audio content that represents the feature of the second audio content;
   generating a third audio content by merging the first vector of the first audio content with the second vector of the second audio content,
   wherein the second vector of the first audio content and the second vector of the second audio content have equal dimensions,
   wherein the optimized first learned model is generated by:
      using an initial first learned model to:
         perform an extraction process on the first audio content to separate the feature of the first audio content from a remainder of the first audio content corresponding to the first audio content without the feature of the first audio content,
         encode the remainder of the first audio content with a first encoder, and encode the feature of the first audio content with a second encoder,
         output the encoded remainder of the first audio content and the encoded feature of the first audio content to a common decoder to reconstitute the first audio content, and
         output the reconstituted first audio content which comprises the decoded remainder of the first audio content and the decoded feature of the first audio content,
      adjusting a parameter of at least one of the first encoder, second encoder or decoder to reduce a difference between the first audio content and the reconstituted first audio content,
      updating the initial first learned model based on the adjusted parameter to create the optimized first learned model, and
      storing the optimized first learned model,
   wherein the optimized second learned model is generated by:
      using an initial second learned model to:
         perform an extraction process on the second audio content to separate the feature of the second audio content from a remainder of the second audio content corresponding to the second audio content without the feature of the second audio content, encode the remainder of the second audio content with the first encoder, and encode the feature of the second audio content with the second encoder, output the encoded remainder of the second audio content and the encoded feature of the second audio content to the common decoder to reconstitute the second audio content, and output the reconstituted second audio content which comprises the decoded remainder of the second audio content and the decoded feature of the second audio content, adjusting a parameter of at least one of the first encoder, second encoder or decoder to reduce a difference between the second audio content and the reconstituted second audio content, updating the initial second learned model based on the adjusted parameter to form the optimized second learned model, and storing the optimized second learned model.

5. A non-transitory computer readable product contacting a program for causing a computer to execute a method, the method comprising:

receiving a user input identifying a feature of a first audio content to be replaced by a feature of a second audio content different from the first audio content;

processing the first a second audio content with an optimized first and second learned model, respectively;

wherein the optimized first learned model generates:
a first vector of the first audio content that represents the first audio content without the feature of the first audio content, and
a second vector of the first audio content that represents the identified feature of the first audio content;

wherein the optimized second learned model generates:
a first vector of the second audio content that represents the second audio content without the feature of the second audio content, and
a second vector of the second audio content that represents the feature of the second audio content;

generating a third audio content by merging the first vector of the first audio content with the second vector of the second audio content, wherein the second vector of the first audio content and the second vector of the second audio content have equal dimensions, wherein the optimized first learned model is generated by:
using an initial first learned model to:
perform an extraction process on the first audio content to separate the feature of the first audio content from a remainder of the first audio content corresponding to the first audio content without the feature of the first audio content, encode the remainder of the first audio content with a first encoder, and encode the feature of the first audio content with a second encoder, output the encoded remainder of the first audio content and the encoded feature of the first audio content to a common decoder to reconstitute the first audio content, and output the reconstituted first audio content which comprises the decoded remainder of the first audio content and the decoded feature of the first audio content, adjusting a parameter of at least one of the first encoder, second encoder or decoder to reduce a difference between the first audio content and the reconstituted first audio content, updating the initial first learned model based on the adjusted parameter to create the optimized first learned model, and storing the optimized first learned model, wherein the optimized second learned model is generated by:
using an initial second learned model to:
perform an extraction process on the second audio content to separate the feature of the second audio content from a remainder of the second audio content corresponding to the second audio content without the feature of the second audio content, encode the remainder of the second audio content with the first encoder, and encode the feature of the second audio content with the second encoder, output the encoded remainder of the second audio content and the encoded feature of the second audio content to the common decoder to reconstitute the second audio content, and output the reconstituted second audio content which comprises the decoded remainder of the second audio content and the decoded feature of the second audio content, adjusting a parameter of at least one of the first encoder, second encoder or decoder to reduce a difference between the second audio content and the reconstituted second audio content, updating the initial second learned model based on the adjusted parameter to form the optimized second learned model, and storing the optimized second learned model.

* * * * *